US008988867B2

(12) United States Patent
Kuroda

(10) Patent No.: US 8,988,867 B2
(45) Date of Patent: Mar. 24, 2015

(54) DISPLAY DEVICE AND TELEVISION RECEIVER

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 13/805,014

(22) PCT Filed: May 24, 2011

(86) PCT No.: PCT/JP2011/061843
§ 371 (c)(1),
(2), (4) Date: Dec. 18, 2012

(87) PCT Pub. No.: WO2011/162064
PCT Pub. Date: Dec. 29, 2011

(65) Prior Publication Data
US 2013/0088820 A1 Apr. 11, 2013

(30) Foreign Application Priority Data

Jun. 24, 2010 (JP) ................................. 2010-143913

(51) Int. Cl.
G06F 1/16 (2006.01)
H05K 5/00 (2006.01)
G02F 1/1333 (2006.01)

(52) U.S. Cl.
CPC ........ *H05K 5/0017* (2013.01); *G02F 1/133308* (2013.01); *G02F 2001/133314* (2013.01); *G02F 2201/505* (2013.01)
USPC ......... 361/679.21; 361/752; 361/767; 349/58

(58) Field of Classification Search
CPC .................. G06F 1/1637; G02F 2001/133314
USPC ..................................................... 361/679.21
See application file for complete search history.

(56) References Cited

U.S. PATENT DOCUMENTS 7,230,659 B2 * 6/2007 Ha et al. ........................... 349/58
8,194,203 B2 * 6/2012 Sekiguchi et al. ............... 349/58
2002/0186333 A1 * 12/2002 Ha et al. ........................... 349/58

(Continued)

FOREIGN PATENT DOCUMENTS

JP 63-170883 U 11/1988
JP 2004-133098 A 4/2004

(Continued)

OTHER PUBLICATIONS

International Search Report corresponding to PCT/JP2011/061843, dated Aug. 23, 2011.

Primary Examiner — Anthony Q Edwards
(74) Attorney, Agent, or Firm — Lowe Hauptman & Ham, LLP

(57) ABSTRACT

A liquid crystal display device is provided with: a liquid crystal panel capable of displaying an image; a backlight unit including cold cathode tubes and a chassis housing the cold cathode tubes and supplying light to the liquid crystal panel; and a second exterior member housing the liquid crystal panel and the backlight unit and including a bottom portion facing the chassis. On a surface of the chassis facing the bottom portion, a plurality of fixing members capable of fixing the bottom portion is provided. The fixing members include inverter covers disposed with a gap from the bottom portion, and reinforcing members abutting on the bottom portion. Between the inverter covers and the bottom portion, spacers with the function of damping vibration are interposed.

20 Claims, 21 Drawing Sheets

(56) References Cited

U.S. PATENT DOCUMENTS

| | | | |
|---|---|---|---|
| 2005/0082963 A1* | 4/2005 | Miyazaki et al. | 313/493 |
| 2005/0088809 A1* | 4/2005 | Nakagawa et al. | 361/681 |
| 2005/0285990 A1* | 12/2005 | Havelka et al. | 349/58 |
| 2006/0146223 A1* | 7/2006 | Iwai et al. | 349/58 |
| 2009/0167980 A1* | 7/2009 | Watanabe | 349/58 |
| 2009/0213293 A1* | 8/2009 | Sekiguchi et al. | 349/58 |
| 2009/0225507 A1* | 9/2009 | Sato | 361/679.21 |
| 2009/0251855 A1* | 10/2009 | Tanokuchi et al. | 361/679.21 |
| 2010/0134714 A1* | 6/2010 | Yoshikawa | 349/58 |

FOREIGN PATENT DOCUMENTS

| | | |
|---|---|---|
| JP | 2004-219476 A | 8/2004 |
| JP | 2009-093156 A | 4/2009 |
| JP | 2009-210814 A | 9/2009 |

* cited by examiner

FIG.1
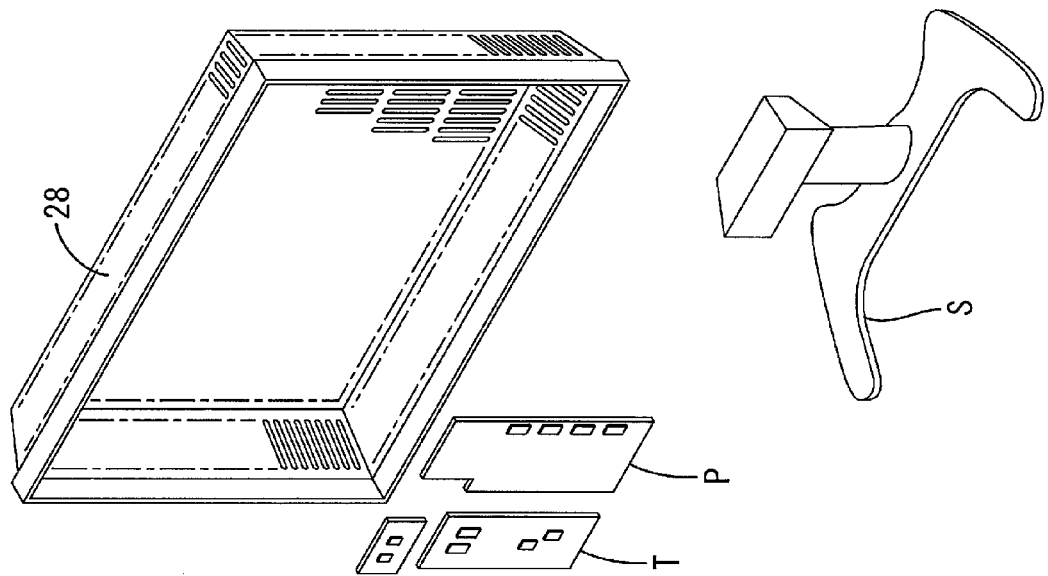
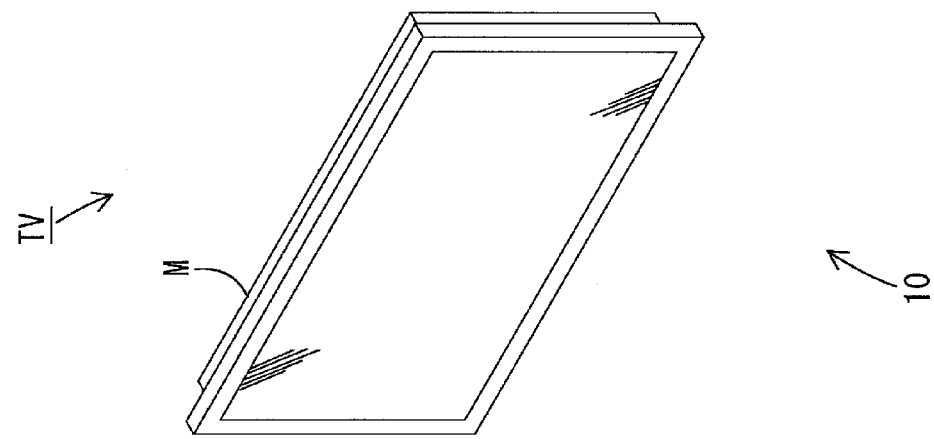
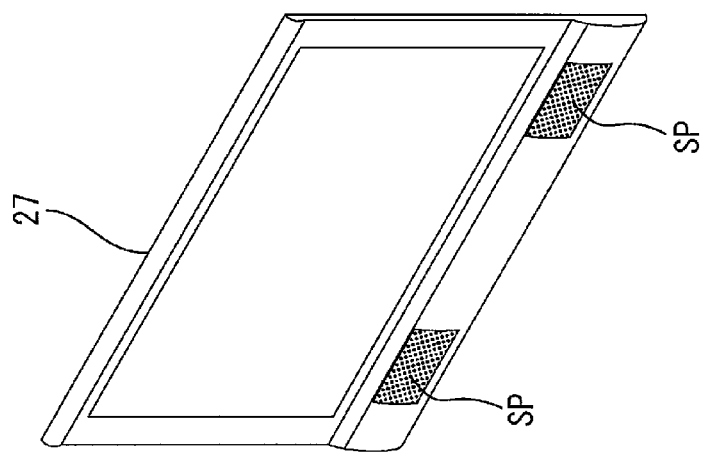

DISPLAY DEVICE AND TELEVISION RECEIVER

RELATED APPLICATIONS

The present application is a National Phase of International Application Number PCT/JP2011/061843, filed May 24, 2011, and claims priority from Japanese Application Number 2010-143913, filed Jun. 24, 2010

TECHNICAL FIELD

The present invention relates to a display device and a television device.

BACKGROUND ART

A liquid crystal panel used in a liquid crystal display device, such as a liquid crystal television set, does not emit light by itself. Thus, such display device needs a backlight unit as a separate lighting unit. Such a backlight unit is installed on the rear side (opposite to the display surface) of the liquid crystal panel. The backlight unit is provided with: a chassis with an opening facing the liquid crystal panel; a light source housed in the chassis; optical members (such as a diffuser sheet) disposed in the opening of the chassis to face the light source and efficiently causing the light emitted by the light source to be output toward the liquid crystal panel; and a reflection sheet disposed in the chassis to face the optical member and reflecting the light toward the opening of the chassis.

Patent Document 1: Japanese Unexamined Patent Publication No. 2009-93156

Problem to be Solved by the Invention

An example of the liquid crystal display device is provided with, in addition to the liquid crystal panel and the backlight unit, an exterior member as an outer box defining external appearance. In the exterior member, the liquid crystal panel and the backlight unit assembled to each other are housed. In this case, the exterior member may resonate with sound emitted from a speaker installed on the exterior member, resulting in noise, such as a so-called buzzing noise.

DISCLOSURE OF THE PRESENT INVENTION

The present invention was made in view of the foregoing circumstances, and an object of the present invention is to suppress noise.

Means for Solving the Problem

A display device according to the present invention includes a display unit configured to display an image; a lighting unit including a light source and a chassis housing the light source, the lighting unit being configured to supply light to the display unit; an exterior member housing the display unit and the lighting unit, the exterior member including a bottom portion facing the chassis; a plurality of fixing members for fixing the bottom portion of the exterior member, the fixing members being disposed on a surface of the chassis facing the bottom portion of the exterior member, and including a first fixing member and a second fixing member, the first fixing member being spaced from the bottom portion of the exterior member, the second fixing member being in contact with the bottom portion; and a spacer configured to damp vibrations and arranged between the first fixing member and the bottom portion of the exterior member.

In this way, the lighting unit includes the light source and the chassis housing the light source, and is housed in the exterior member together with the display unit to which the light from the light source is supplied. The bottom portion of the exterior member is fixed onto the plurality of fixing members of the chassis. The plurality of fixing members includes the first fixing member and the second fixing member. The first fixing member is spaced from the bottom portion of the chassis. The second fixing member is in contact with the bottom portion. The second fixing member is directly fixed onto the bottom portion in an abutting manner, while the first fixing member is fixed with the gap with respect to the bottom portion. Thus, vibration is relatively easily caused in the portion of the bottom portion that is fixed by the first fixing member, and noise may be caused. According to the present invention, the spacer is interposed between the first fixing member and the bottom portion. Thus, the vibration that may be caused in the portion of the bottom portion that is fixed by the first fixing member, for example, can be damped by the spacer. Accordingly, the development of noise due to the vibration caused in the bottom portion of the exterior member can be suppressed in a preferred manner. Further, vibration that may be caused in the first fixing member can also be damped by the spacer, and thereby, the development of noise can be suppressed in a preferred manner.

Preferred embodiments of the present invention may include the following.

(1) The spacer may be a separate component from the first fixing member and the bottom portion of the exterior member. In this way, the degree of freedom in selecting the material and the like of the spacer can be increased, and thereby the vibration damping function of the spacer can be sufficiently increased.

(2) The spacer may be made of an elastic material. In this way, the first fixing member and the bottom portion of the exterior member can be prevented from vibrating by the spacer of elastic material, and thereby the vibration can be effectively damped.

(3) The spacer may be made of a rubber material. In this way, the material cost for the spacer can be decreased. In addition, high anti-vibration effect can be obtained particularly for vibration of lower frequencies.

(4) The spacer may have a sheet shape extending along the bottom portion of the exterior member. In this way, because the spacer has the sheet shape extending along the bottom portion, the vibration that may be caused in the bottom portion can be damped over a wide area in a preferred manner. Thus, the development of noise can be prevented in a more preferred manner.

(5) The first fixing member may have an elongated shape, and the spacer may have an elongated shape with a long side direction aligned with a long side direction of the first fixing member. In this way, the vibration that may be caused in the elongated first fixing member can be damped in a more preferred manner by the similarly elongated spacer disposed with the long side direction aligned with the long side direction of the first fixing member.

(6) The spacer may be integrally provided with at least one of the first fixing member and the bottom portion of the exterior member. In this way, the spacer can be disposed at an appropriate position.

(7) The spacer may have a spring shape protruding from at least one of the first fixing member and the bottom portion of the exterior member toward the other one of the first fixing member and the bottom portion of the exterior member, and is in contact therewith. In this way, because the spacer protruding from one of the first fixing member and the bottom portion of the exterior member toward the other one of the first fixing member and the bottom portion of the exterior member has a spring shape, vibration can be damped in a preferred manner by the resilience of the spacer.

(8) The spacer may be fixed to the other one of the first fixing member and the bottom portion of the exterior member. In this way, the bottom portion of the exterior member and the first fixing member can be fixed with each other by the spacer fixed to the other one of the first fixing member and the bottom portion of the exterior member. Therefore, the number of components can be decreased, for example.

(9) The lighting unit may include a power supply board and a board cover. The power supply board may be disposed between the chassis and the bottom portion of the exterior member, and is configured to supply drive power to the light source. The board cover may cover the power supply board and may be attached to the chassis and the board cover may constitute the first fixing member. The spacer may be disposed between the board cover and the bottom portion of the exterior member. Because the board cover is attached to the chassis while covering the power supply board, the portion of the board cover that is not fixed onto the chassis tends to be increased, resulting in a greater tendency for vibration. According to the present invention, the board cover constitutes the first fixing member and is fixed onto the bottom portion of the exterior member with the spacer between with the bottom portion of the exterior member. Thus, particularly the vibration that may be caused in the board cover can be suppressed in a preferred manner, and thereby the development of noise can be more effectively suppressed.

(10) The board cover may include an attaching portion disposed at an outer end attached to the chassis, and the spacer may be disposed in a central position of the board cover away from the attaching portion. Because the outer end of the board cover is attached to the chassis by the attaching portion but the central portion of the board cover spaced away from the attaching portion is not fixed onto the chassis, vibration tends to be easily caused at the central position. According to the present invention, the spacer is disposed in the central position of the board cover spaced away from the attaching portion, and thereby the vibration that may be caused in the board cover can be more effectively suppressed.

(11) The attaching portion may include a plurality of attaching portions arranged away from each other at the outer end of the board cover, and the spacer may be disposed in an intermediate position on the board cover between the adjacent attaching portions. In this way, while vibration tends to be more easily caused in the intermediate position between the adjacent attaching portions on the board cover, the vibration that may be caused in the board cover can be more effectively suppressed by the spacer disposed in the intermediate position.

(12) The power supply board may include a step transformer. Generally, when a power supply board with a transformer, which is a relatively large electronic component, mounted thereon is used, the space between the board cover and the chassis tends to be increased, resulting in greater tendency for vibration in the board cover. According to the present invention, the vibration that may be caused in the board cover can be effectively suppressed by the spacer.

(13) The light source may include a plurality of light sources each having a liner shape and the light source may be arranged parallel to each other in the chassis with axis thereof aligned a same direction. The power supply board and the board cover may extend in a that crosses the axed of the light sources and may have dimensions that cover the plurality of the light sources. In this way, while the size of the power supply board and the board cover tends to be increased, resulting in greater tendency for vibration in the board cover, the vibration that may be caused in the board cover can be effectively suppressed by the spacer according to the present invention.

(14) The display device may further include a connector arranged at an end of the chassis. The light source may have a linear shape and include an external connecting portion at an end portion thereof, the connector may be configured to electrically connect the external connecting portion to the power supply board to relay the power, and the power supply board and the board cover may be adjacently arranged to the connector. In this way, drive power can be supplied to the light source via the connector arranged at the end of the chassis electrically connecting the power supply board disposed adjacent to the connector to the external connecting portion disposed at the end of the light source.

(15) The display device may further include a reinforcing member extending along a side of the chassis, and the reinforcing member may constitute the second fixing member. In this way, because the chassis can be reinforced by the reinforcing member extending along the side of the chassis, deformation of the chassis, such as warping, can be made difficult to occur. In addition, because the reinforcing member constitutes the second fixing member and is directly fixed onto the bottom portion of the exterior member in an abutting manner, the bottom portion as well as the chassis can be reinforced. Thus, vibration of the bottom portion can be made more difficult to occur.

(16) The reinforcing member may be arranged closer to the center of the chassis and the bottom portion than the first fixing member. In this way, the chassis and the bottom portion can be more effectively reinforced by the reinforcing member arranged closer to the center than the first fixing member because the chassis and the bottom portion tend to be deformed, such as by warping, more at the center than at the ends.

(17) The reinforcing member may extend along the entire length of a side of the chassis. In this way, the chassis and the bottom portion can be more effectively reinforced.

(18) The light source may be a cold cathode tube. In this way, increased operating life can be achieved and lighting control can be performed easily.

(19) The display unit may be a liquid crystal panel including a pair of substrates with liquid crystal enclosed therebetween. In this way, the display panel can be used for various purposes, such as for television or personal computer displays, particularly for large screens.

Advantageous Effect of the Invention

According to the present invention, the development of noise can be suppressed.

BRIEF DESCRIPTION OF THE DRAWINGS

FIG. 1 is an exploded perspective view illustrating a schematic configuration of a television device according to a first embodiment of the present invention;

BEST MODE FOR CARRYING OUT THE INVENTION

First Embodiment

A first embodiment of the present invention will be described with reference to FIGS. 1 to 7. According to the present embodiment, a liquid crystal display device 10 will be described by way of example. In some parts of the drawings, an X-axis, a Y-axis, and a Z-axis are shown as the respective axial directions corresponding to the directions shown in the respective drawings. The upper side and the lower side shown in FIGS. 3 and 4 correspond to the front side and the rear side, respectively.

Figure 2:
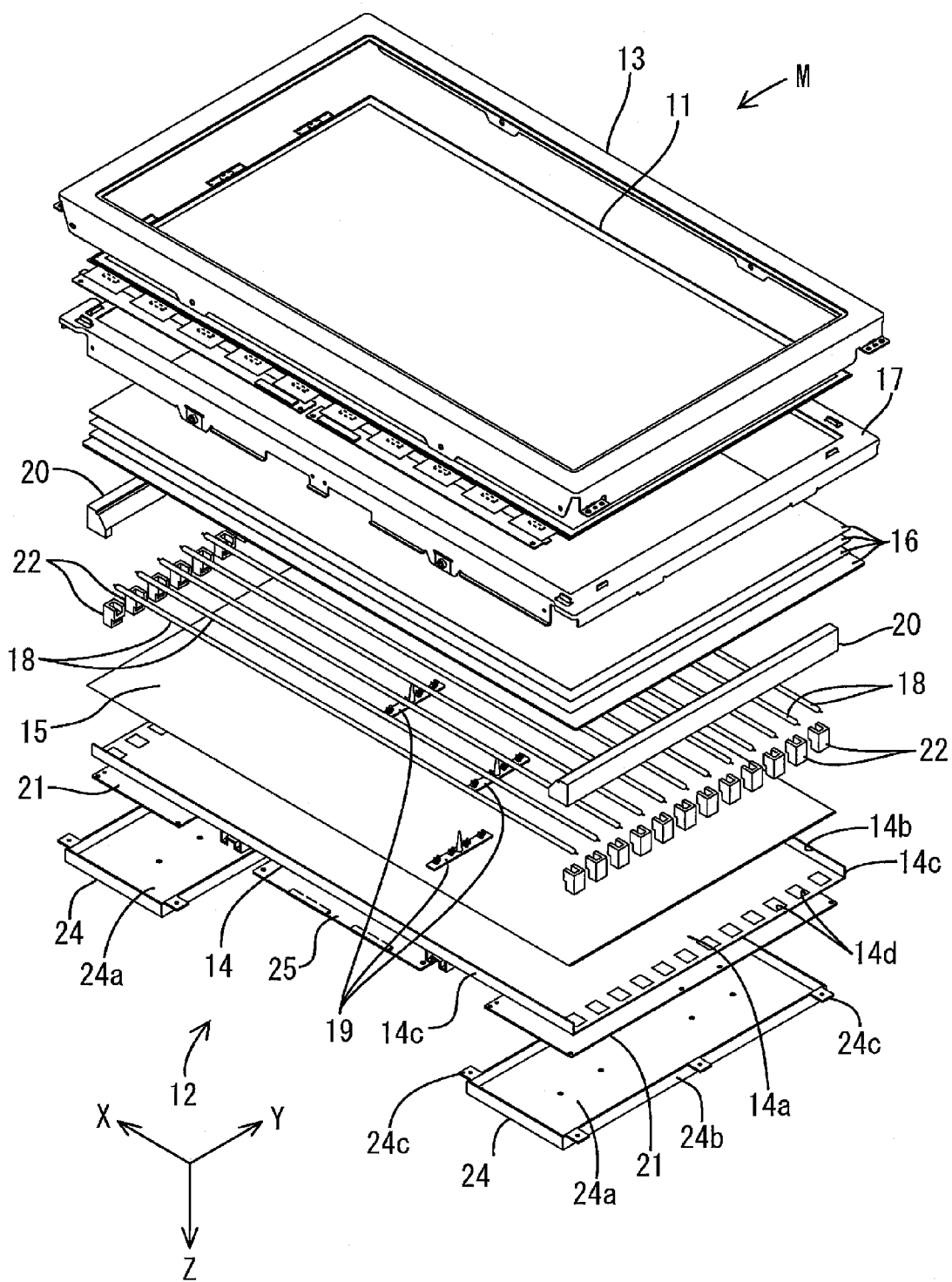
FIG. 2 is an exploded perspective view illustrating a schematic configuration of a liquid crystal display module in a liquid crystal display device of the television device.

The liquid crystal display device 10 according to the present embodiment, as shown in FIG. 1, is provided with a liquid crystal display module M; a stand S supporting the liquid crystal display module M such that a display surface of the liquid crystal display module M extends along the vertical direction (Y-axis direction); and a pair of exterior members 27 and 28 housing the liquid crystal display module M. By installing a power supply board P, a tuner T and the like in the exterior members 27 and 28 of the liquid crystal display device 10, a television device TV configured to receive a television signal and display an image based on the television signal is obtained. The liquid crystal display module M has a generally horizontally long square shape and is provided with, as shown in FIG. 2, a liquid crystal panel 11 as a display panel (display unit), and a backlight unit (lighting unit) 12 as an external light source. The liquid crystal panel 11 and the backlight unit 12 are integrally held by a frame-shaped bezel 13, for example.

Figure 3:
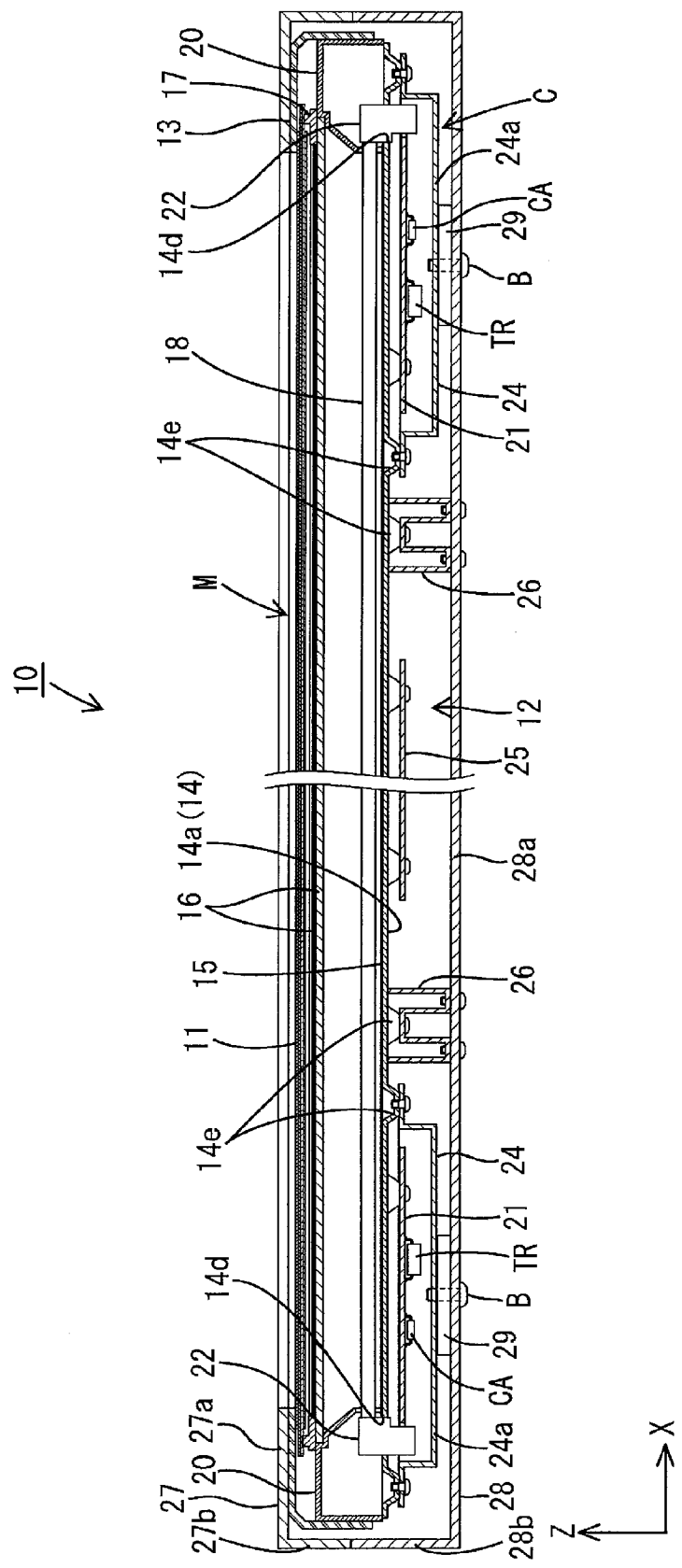
FIG. 3 is a cross sectional view of the liquid crystal display device taken along a long side direction thereof.
Figure 4:
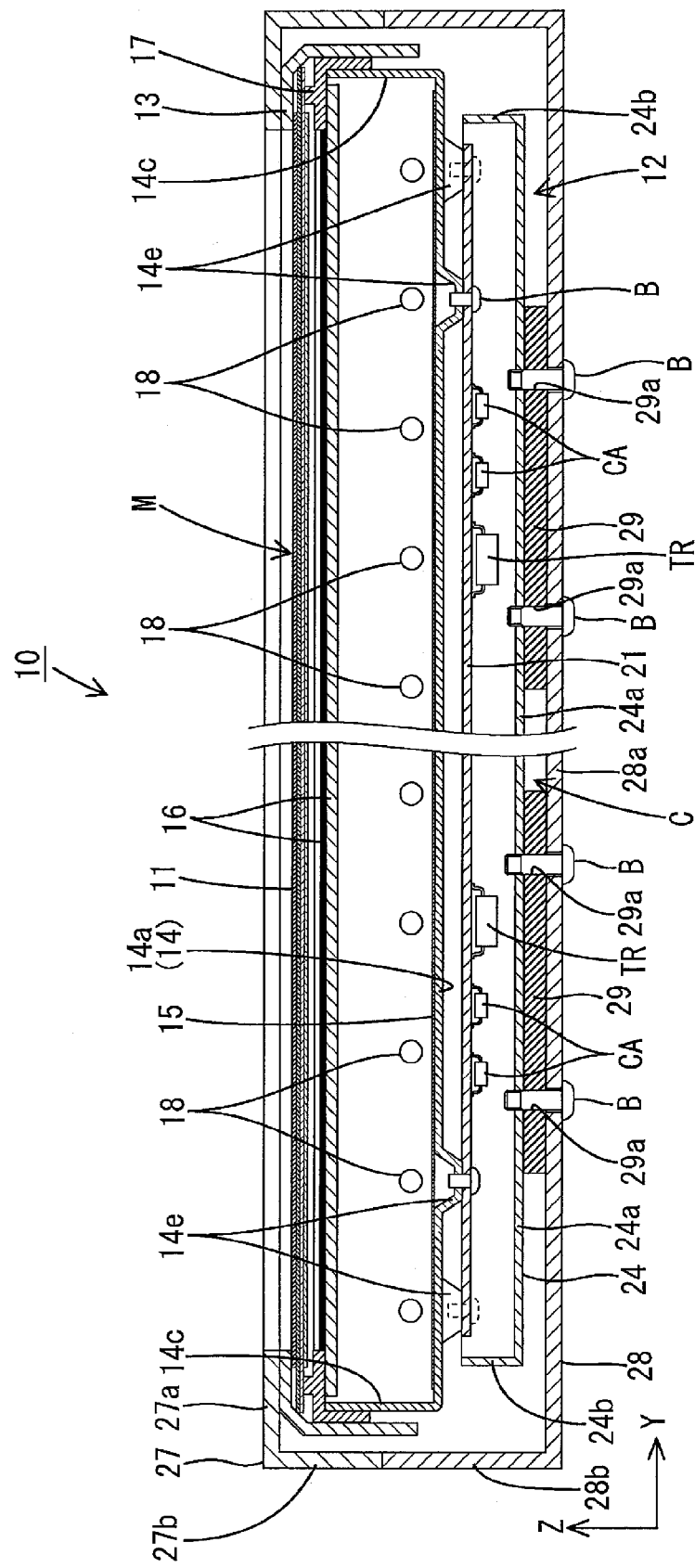
FIG. 4 is a cross sectional view illustrating an end portion of the liquid crystal display device in the long side direction thereof taken along a short side direction thereof.
Figure 7:
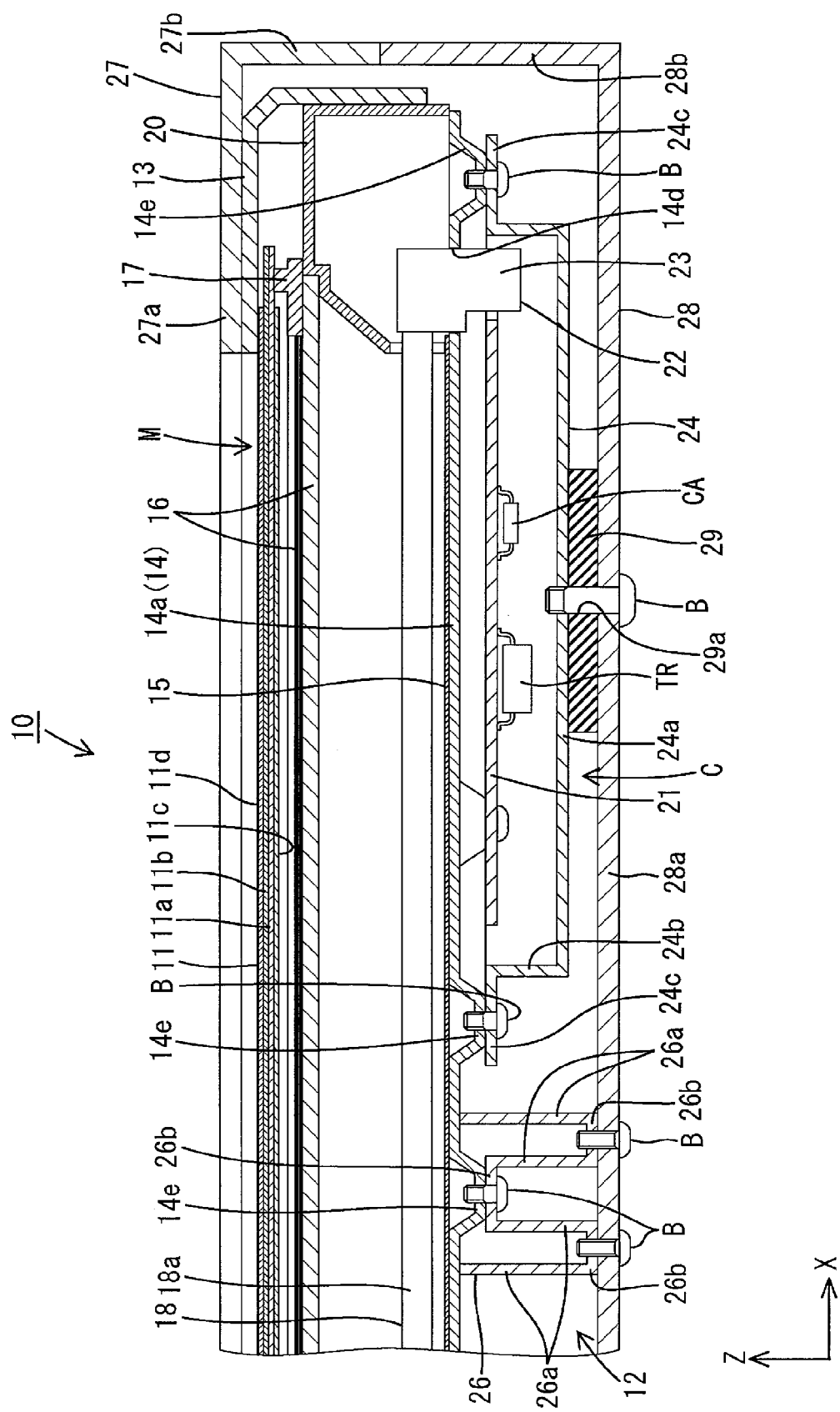
FIG. 7 is an enlarged cross sectional view of main parts of FIG. 3.

The liquid crystal panel 11 and the backlight unit 12 of the liquid crystal display module M will be described in sequence. The liquid crystal panel 11 has a horizontally long square shape (an elongated shape with a long side direction aligned with the X-axis direction) in plan view. The liquid crystal panel 11 includes, as shown in FIGS. 3, 4, and 7, a pair of glass substrates 11a and 11b affixed to each other with a predetermined gap therebetween, and a liquid crystal layer (not shown) is enclosed between the glass substrates 11a and 11b. The glass substrate 11a has switching components (for example, TFTs) connected to a source wiring and a gate wiring, which are orthogonal to each other, pixel electrodes connected to the switching components, an alignment film, and the like. The glass substrate 11b has a color filter including color sections of, for example, R (red), G (green), and B (blue) in a predetermined arrangement, counter electrodes, an alignment film, and the like. To the source wiring, the gate wiring, the counter electrodes and the like, various liquid crystal drive signals are output from control boards 25. On the outside of the glass substrates 11a and 11b, polarizing plates 11c and 11d, respectively, are disposed.

As shown in FIGS. 2 and 3, the backlight unit 12 is of the so-called direct type in which the light source is disposed immediately under the backside of the liquid crystal panel 11. The backlight unit 12 includes a substantially box-shaped chassis 14 with an opening on the front side (light output side; facing the liquid crystal panel 11); a reflection sheet 15 laid within the chassis 14; a plurality of optical members 16 disposed to cover an opening portion 14b of the chassis 14; a frame 17 configured to hold the optical members 16; a plurality of cold cathode tubes (light sources) 18 housed in the chassis 14 side by side with each other; lamp clips 19 holding the central portion of the cold cathode tubes 18; connectors 22 electrically connecting the cold cathode tubes 18 to inverter boards 21 while holding the end portions of the cold cathode tubes 18; optical reflective lamp holders 20 shielding the end portions of the cold cathode tubes 18 from the light; the inverter boards (power supply boards) 21 that supply drive power to the cold cathode tubes 18 via the connectors 22; inverter covers 24 covering the inverter boards 21; the control boards 25 that output a liquid crystal drive signal to the liquid crystal panel 11; the power supply board P that supplies electric power to the inverter boards 21, the control boards 25 and the like; and reinforcing members 26 reinforcing the chassis 14.

The chassis 14 is made of metal, such as aluminum, and includes, as shown in FIGS. 2 to 4, a bottom plate 14a with a horizontally long square shape (an elongated shape with a long side direction aligned with the X-axis direction) in plan view similar to the liquid crystal panel 11; and a pair of side plates 14c rising from the outer ends of the bottom plate 14a on the long sides. The long side direction of the bottom plate 14a is aligned with the X-axis direction as shown, and a short side direction thereof is aligned with the Y-axis direction as shown. The bottom plate 14a faces the rear side of the cold cathode tubes 18; in other words, the bottom plate 14a is disposed on the opposite side to the light output side of the cold cathode tubes 18. The bottom plate 14a has a plurality of attaching holes 14d for the connectors 22 at corresponding positions thereof. The bottom plate 14a includes a plurality of mount base portions 14e protruding on the rear side, on which the inverter boards 21, the inverter covers 24, the control boards 25, the reinforcing members 26, and the power supply board P are attached. The mount base portions 14e are formed by causing the bottom plate 14a to partially bulge by drawing, for example. The reflection sheet 15 is made of white synthetic resin with excellent optical reflectivity, and laid to cover substantially the entire area on the inner surface of the bottom plate 14a of the chassis 14. The reflection sheet 15 has the function of reflecting the light from the cold cathode tubes 18 toward the optical members 16 (light output side).

The optical members 16 have a rectangular shape in plan view similar to the bottom plate 14a of the chassis 14 or the liquid crystal panel 11. The optical members 16 are made of a light transmissive synthetic resin and disposed between the cold cathode tubes 18 on the rear side and the liquid crystal panel 11 on the front side. The optical members 16 include a diffuser plate, a diffuser sheet, a lens sheet, and a brightness enhancement sheet, for example, successively from the rear side. The optical members 16 have the function of converting the light emitted from the cold cathode tubes 18, which are tubular light sources, into even planar light, for example.

The frame 17 has a frame shape extending along the outer peripheral edge portions of the liquid crystal panel 11, the optical members 16 and the like. The frame 17 is disposed on the front side of the optical members 16 and configured to sandwich the outer peripheral edge portions of the optical members 16 between with the side plates 14c of the chassis 14 and the lamp holders 20, which will be described later. The frame 17 is also configured to receive the rear side of the liquid crystal panel 11 such that the liquid crystal panel 11 is sandwiched between the frame 17 and the bezel 13 disposed on the front side of the liquid crystal panel 11.

Figure 5:
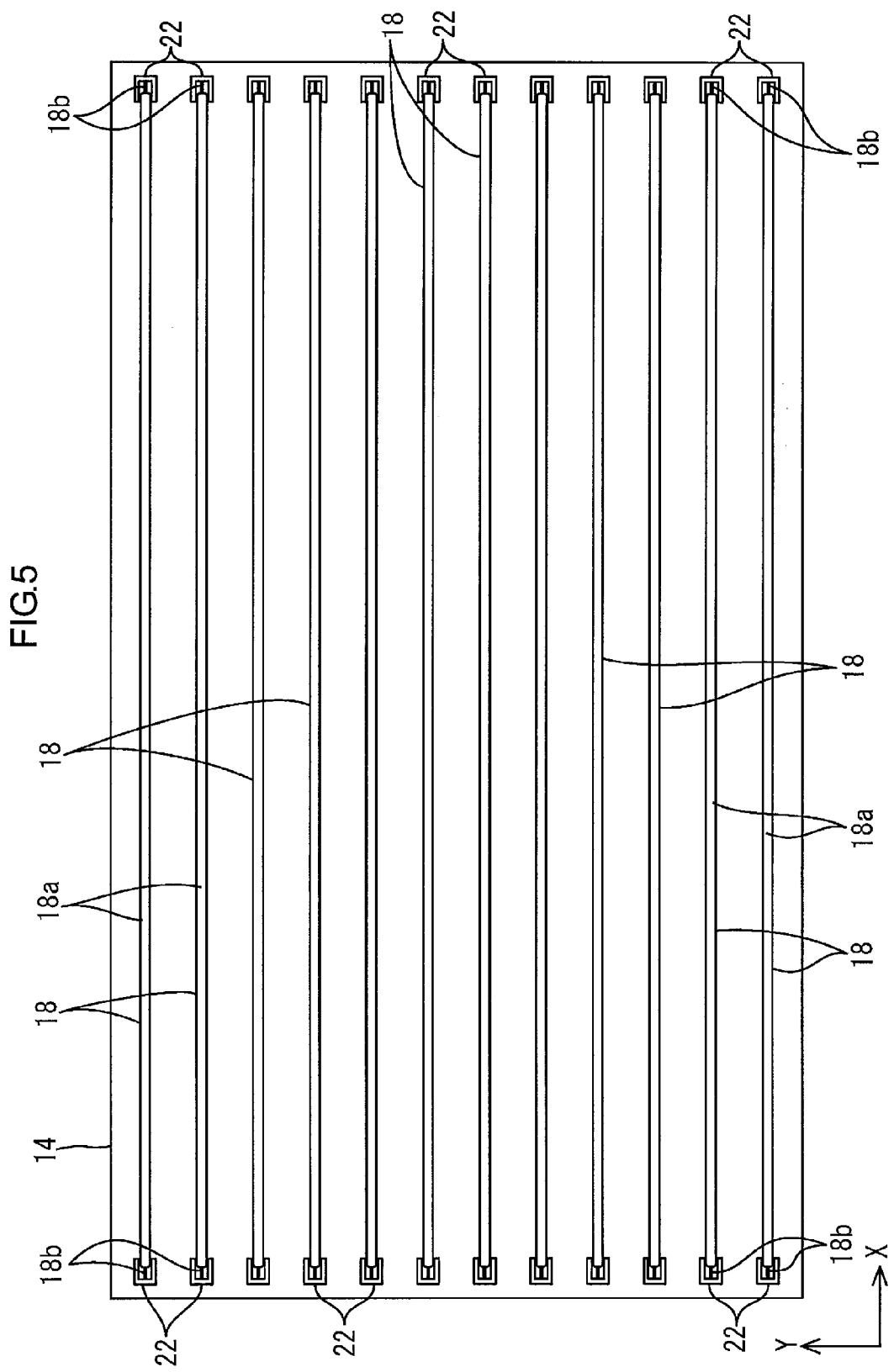
FIG. 5 is a plan view illustrating an arrangement of cold cathode tubes and connectors on a chassis of the liquid crystal display device.

The cold cathode tubes 18, which are a type of linear light source (tubular light source), are housed in the chassis 14 with the axis direction of the cold cathode tubes 18 aligned with the long side direction (X-axis direction) of the chassis 14, as shown in FIG. 5. Specifically, a plurality (twelve in FIG. 5) of the cold cathode tubes 18 are disposed at predetermined intervals in the short side direction (Y-axis direction) of the chassis 14 with their axes substantially parallel to each other. Thus, the end portions of the cold cathode tubes 18 are arranged parallel to each other in the short side direction of the chassis 14 at long-side end portions thereof. The cold cathode tubes 18 are arranged at substantially equal intervals or pitches.

The cold cathode tubes 18, which are a type of discharge tube, respectively include a thin glass tube 18a of circular cross section with sealed end portions; a pair of electrode portions (not shown) enclosed inside both end portions of the glass tube 18a; and a pair of outer leads (external connecting portions) 18b outwardly protruding from the end portions of the glass tube 18a. The cold cathode tubes 18 are of the so-called straight tube type, each in which the glass tube 18a extends straight and the electrode portions are distributed in two directions (to the right and left in FIG. 5). The glass tube 18a encloses a light emitting substance such as mercury inside, with an inner wall surface coated with phosphors (both phosphors and mercury not shown). The electrode portions and the outer leads 18b are made of electrically conductive metal material. Preferably, the electrode portions are made of an alloy with excellent spattering resistance. The outer leads 18b have a thin, substantially bar-like shape penetrating the sealed ends of the glass tube 18a and protruding outward along the axis direction (X-axis direction; length direction) of the glass tube 18a. The internal end portion of the outer leads 18b is connected to the electrode portions within the glass tube 18a, such that the outer leads 18b and the electrode portions have the same potential.

The lamp clips 19 are made of white synthetic resin with excellent optical reflectivity and, as shown in FIG. 2, are disposed with a predetermined distribution on the inner surface of the bottom plate 14a of the chassis 14. The lamp clips 19 are fixedly attached to the bottom plate 14a of the chassis 14 and configured to hold a central portion of the cold cathode tubes 18, i.e., the portion other than the end portions. Thus, a certain interval can be maintained between the cold cathode tubes 18 and the bottom plate 14a of the chassis 14. In FIGS. 3 to 7, the lamp clips 19 are omitted.

The lamp holders 20 are made of white synthetic resin with excellent optical reflectivity and, as shown in FIGS. 2 and 3, have a substantially box-like shape extending along the short side direction of the chassis 14 with an opening on the rear side. A pair of the lamp holders 20 is attached at both end portions of the chassis 14 on the short sides to cover the end portions of the cold cathode tubes 18 arranged parallel to each other and the connectors 22 which will be described later, together. The lamp holders 20 include a stepped portion on the front side as an optical member mount portion, as shown in FIG. 3, on which the optical members 16 are placed. The lamp holders 20 also include an inclined portion from the optical member mount portion toward the bottom plate 14a of the chassis 14.

The inverter boards 21 include a board of synthetic resin (such as phenolic paper or glass-epoxy resin) on which a predetermined circuit pattern (not shown) is formed and various electronic components, such as a transformer TR, a capacitor CA and the like, are mounted. The transformer TR is an electronic component of an inverter circuit and has a step function. The transformer TR is relatively large compared with the other electronic components, such as the capacitor CA. The inverter boards 21 are connected to the power supply board P and have the function to control the turning on and off of the cold cathode tubes 18 by, for example, boosting an input voltage from the power supply board P by the inverter circuit including the transformer TR and the like, and outputting an output voltage higher than the input voltage to the cold cathode tubes 18.

The inverter boards 21, as shown in FIGS. 3 and 4, are disposed on the rear side of the chassis 14; i.e., on the side opposite to the cold cathode tubes 18. Specifically, a pair of the inverter boards 21 is disposed around the ends on the bottom plate 14a of the chassis 14 in the long side direction and fixed in place with screws B onto the mount base portions 14e of the bottom plate 14a. The inverter boards 21 have a vertically elongated shape with a long side direction aligned with the Y-axis direction (short side direction of the chassis 14) and a short side direction aligned with the X-axis direction (long side direction of the chassis 14). The inverter boards 21, as shown in FIG. 4, have a size to intersect (traverse) all of the cold cathode tubes 18 housed in the chassis 14. Specifically, the long side dimension of the inverter boards 21 may be slightly smaller than the short side dimension of the bottom plate 14a of the chassis 14. At an end portion of the inverter boards 21, connector connecting portions individually engaged to the connectors 22 are formed.

The connectors 22, as shown in FIGS. 3 and 5, are disposed on the chassis 14 in pairs at positions corresponding to both end portions of the respective cold cathode tubes 18, i.e., at the ends of the bottom plate 14a in the long side direction, such that a plurality of the connectors 22 (corresponding to the number of the cold cathode tubes 18) are arranged along the short side direction (Y-axis direction, in which the cold cathode tubes 18 are arranged parallel to each other) of the bottom plate 14a. The connectors 22 are arranged at substantially the same pitch as the cold cathode tubes 18. The arrangement positions of the respective connectors 22 substantially correspond with those of the respective cold cathode tubes 18 in the Y-axis direction. The bottom plate 14a of the chassis 14 has a plurality of attaching holes 14d for the connectors 22 (corresponding to the number of the cold cathode tubes 18), which are disposed side by side at positions corresponding to the connectors 22 along the Y-axis direction.

The connectors 22, as shown in FIG. 7, are provided with a housing 23 of synthetic resin with insulating property and substantially block-shape as a whole, and a connecting terminal (not shown) housed in the housing 23. The connectors 22 are assembled to the chassis 14 through the bottom plate 14a thereof. The housing 23 receives the end portion (including the outer leads 18b) of the cold cathode tubes 18 inside the chassis 14, while receives the connector connecting portions of the inverter boards 21 outside the chassis 14. The connecting terminal housed in the housing 23 has one end in contact with the outer leads 18b of the cold cathode tubes 18 inside the chassis 14, and the other end in contact with the connector connecting portions of the inverter boards 21 outside the chassis 14. Thus, an output voltage from the inverter boards 21 are configure to be input to the outer leads 18b and the electrode portions of the cold cathode tubes 18 via the connecting terminal of the connectors 22.

The inverter covers 24, as shown in FIGS. 3 and 4, are attached to the rear side of the bottom plate 14a of the chassis 14, covering substantially the entire area of the inverter boards 21. The inverter covers 24 also cover the connectors 22, which are arranged side by side along the Y-axis direction at the end portions of the bottom plate 14a in the long side direction, from the rear side together with the inverter boards 21. Specifically, the inverter covers 24 have a substantially box-like shape as a whole with an opening on the front side. The inverter covers 24 include a main body portion 24a facing the inverter boards 21 with a predetermined interval therebetween along the Z-axis direction; side wall portions 24b rising from the outer ends on the sides of the main body portion 24a toward the front side; and attaching portions 24c extending outward from the side wall portions 24b and attached to the bottom plate 14a.

Figure 6:
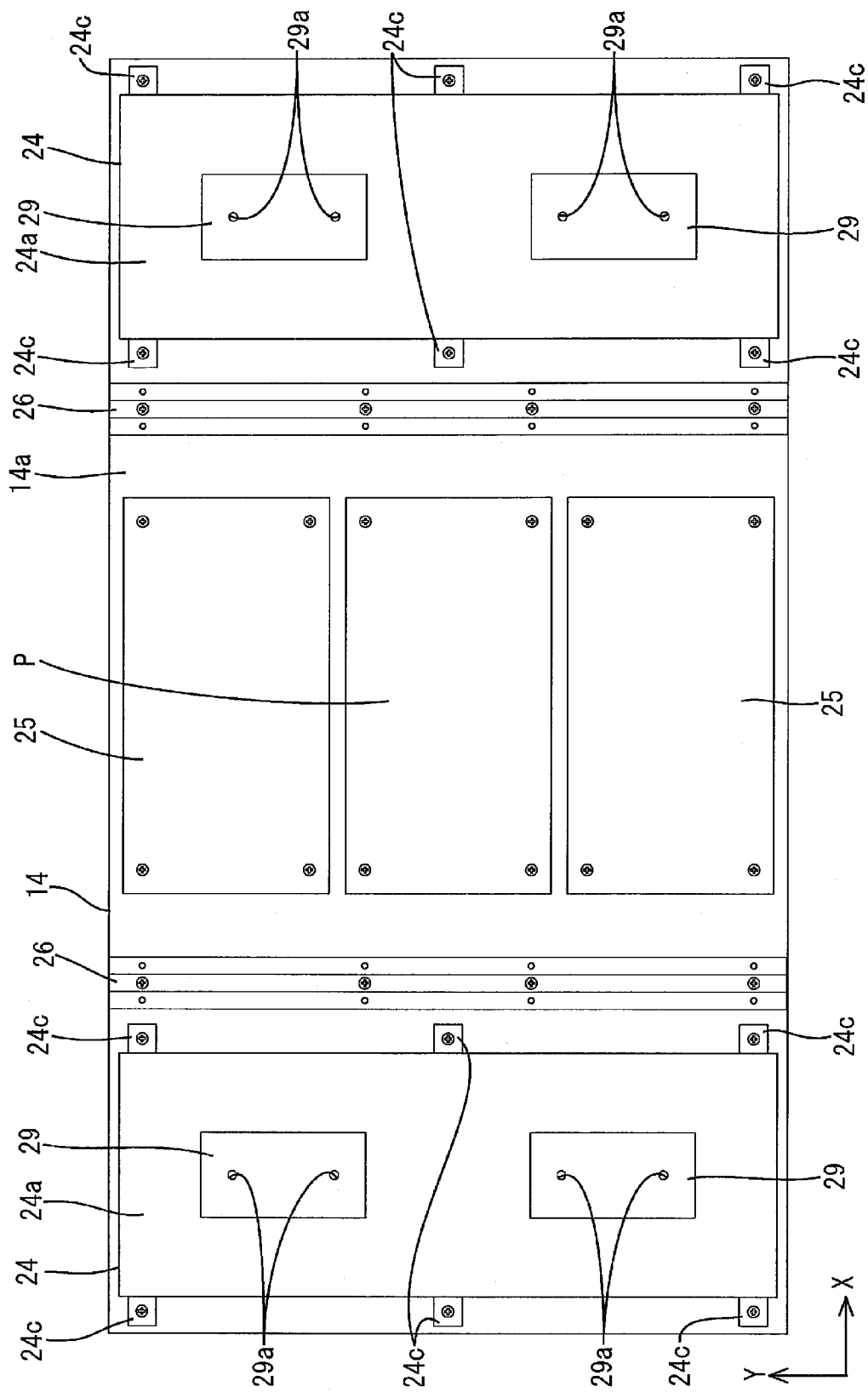
FIG. 6 is a bottom view illustrating an arrangement of a power supply board, control boards, reinforcing members, inverter covers, and spacers on the chassis of the liquid crystal display device.

The main body portion 24a, as shown in FIG. 6, has a vertically elongated shape similar to the inverter boards 21, with a long side dimension (dimension in the Y-axis direction) larger than the long side dimension of the inverter boards 21 and slightly smaller than the short side dimension of the bottom plate 14a. The side wall portions 24b have a substantially rectangular tubular shape as a whole, of which a height dimension provides a sufficient gap between the largest electronic component mounted on the inverter boards 21 (the transformer TR in the present embodiment) and the main body portion 24a, as shown in FIG. 7. The attaching portions 24c protrude outwardly along the X-axis direction partially from the rising ends of a pair of the side wall portions 24b on the long sides thereof, and are fixed with the screws B onto the mount base portions 14e of the bottom plate 14a. A plurality of the attaching portions 24c, as shown in FIG. 6, is provided side by side intermittently on the inverter covers 24 with respect to the long side direction (Y-axis direction). Specifically, a total of six attaching portions 24c are provided on each of the inverter covers 24, including ones substantially at the ends in the long side direction and ones at substantially the center in the long side direction.

The control boards 25, as shown in FIG. 3, include a board of synthetic resin (such as phenolic paper or glass-epoxy resin), on which a predetermined circuit pattern (not shown) is formed. The control boards 25 have the function of converting various input signals, such as a television signal from the tuner T, into a liquid crystal drive signal, and outputting the liquid crystal drive signal to the liquid crystal panel 11. The control boards 25, as shown in FIG. 6, are disposed on the rear side of the chassis 14. Specifically, a pair of the control boards 25 is disposed substantially at the center in the long side direction and at the ends in the short side direction of the bottom plate 14a. The power supply board P is an electric power supply source to the inverter boards 21, the control boards 25 and the like. The power supply board P is disposed on the rear side of the chassis 14 between the pair of control boards 25, i.e., substantially at the center of the bottom plate 14a. The control boards 25 and the power supply board P are fixed onto the mount base portions 14e of the bottom plate 14a with the screws B (FIG. 3).

The reinforcing members 26, as shown in FIGS. 3 and 6, are made of metal as is the chassis 14, and have a substantially pillar-like shape as a whole extending along the Y-axis direction (short side direction of the chassis 14; the vertical direction). A pair of the reinforcing members 26 is disposed on the rear side of the bottom plate 14a of the chassis 14, specifically, in the X-axis direction thereof, across the control boards 25 (power supply board P) at the center and between the inverter covers 24 (inverter boards 21) at the ends. The reinforcing members 26 extend along substantially the entire length of the bottom plate 14a of the chassis 14 with respect to the short side direction. The reinforcing members have a substantially inverted-M cross section perpendicularly to the Y-axis direction, as shown in FIG. 7, which is obtained by bending a metal sheet, for example. Specifically, the reinforcing members 26 include four first plate portions 26a (extending along the Z-axis direction) orthogonal to the plane of the bottom plate 14a, and three second plate portions 26b (extending along the X-axis direction) parallel to the plane of the bottom plate 14a. The adjacent first plate portions 26a are joined by the second plate portions 26b. Of the three second plate portions 26b, the central one is fixed onto the mount base portions 14e of the bottom plate 14a of the chassis 14 with the screws B, while the second plate portions 26b on either side are fixed onto the second exterior member 28, which will be described later, with the screws B.

The pair of exterior members 27 and 28, in which the liquid crystal display module M is housed, is made of synthetic resin. As shown in FIG. 1, the first exterior member 27 is disposed on the front side (display surface side) with respect to the liquid crystal display module M, while the second exterior member 28 is disposed on the rear side (opposite to the display surface side). In other words, the liquid crystal display module M is sandwiched between the pair of exterior members 27 and 28 that is divided along the display surface at a predetermined position in the thickness direction thereof (Z-axis direction).

As shown in FIGS. 3 and 4, the first exterior member 27 on the front side includes a frame-shaped portion 27a with a central opening, and side portions 27b protruding from the outer ends of the frame-shaped portion 27a toward the rear side. The frame-shaped portion 27a has a frame shape surrounding the display surface of the liquid crystal panel 11 such that the user can view an image displayed on the display surface. The bezel 13 is held by the frame-shaped portion 27a from the front side. Further, the frame-shaped portion 27a is integrally provided with speakers SP, as shown in FIG. 1, which emit sound associated with the displayed image to the user. The speakers SP are connected to an amplifier circuit (not shown), to which a sound signal associated with the display image is output from the control boards 25. The side portions 27b have a rectangular tubular shape as a whole.

As shown in FIGS. 3 and 4, the second exterior member 28 on the rear side has a substantially box-like shape as a whole with an opening on the front side. The second exterior member 28 includes a bottom portion 28a covering the liquid crystal display module M from the back side thereof, and side portions 28b protruding from the outer ends of the bottom portion 28a toward the front side. The bottom portion 28a has a horizontally elongated shape slightly larger than the chassis 14, and is disposed facing (and away from) the bottom plate 14a of the chassis 14 with a predetermined interval therebetween. In other words, the bottom plate 14a of the chassis 14, together with the components (such as the inverter covers 24, the control boards 25, the reinforcing members 26, and the power supply board P) attached thereto, is entirely covered by the bottom portion 28a of the second exterior member 28 from the rear side. The side portions 28b form a rectangular tubular shape as a whole, and are fixed while being abutted on the end faces of the side portions 27b of the first exterior member 27, thus providing the space for housing the liquid crystal display module M within the exterior members 27 and 28.

As shown in FIG. 7, the bottom portion 28a of the second exterior member 28 is fixed onto the inverter covers 24 and the reinforcing members 26 of the liquid crystal display module M respectively with the screws B. In other words, the inverter covers 24 and the reinforcing members 26 constitute fixing members with respect to the bottom portion 28a. Specifically, the inverter covers 24 constitute first fixing members with a gap C from the bottom portion 28a, while the reinforcing members 26 constitute second fixing members abutted on the bottom portion 28a. The reinforcing members 26 are directly fixed onto the bottom portion 28a in an abutting manner while the inverter covers 24 are spaced apart from the bottom portion 28a with the gap C therebetween. Therefore, vibration tends to be generated in the fixed portions of the bottom portion 28a with respect to the inverter covers 24, possibly resulting in noise such as buzzing noise. Thus, according to the present embodiment, the spacers 29 with a vibration damping function are disposed between the inverter covers 24 and the bottom portion 28a. In the following, the spacers 29 will be described in detail.

As shown in FIGS. 3, 4, and 7, the spacers 29 are sandwiched between the main body portion 24a of the inverter covers 24 and the bottom portion 28a of the second exterior member 28 such that the gap C is partially filled. The spacers 29 are made of rubber material which is a kind of elastic material, and sandwiched between the main body portion 24a and the bottom portion 28a in a slightly elastically compressed state. Thus, the spacers 29 are closely adhered to the main body portion 24a and the bottom portion 28a in a surface-to-surface manner. Accordingly, the vibration which may be caused in the main body portion 24a or the bottom portion 28a can be efficiently absorbed and damped. In other words, according to the present embodiment, the main body portion 24a and the bottom portion 28a are vibration-insulated by the anti-vibration function of the spacers 29. Examples of the material of the spacers 29 are natural rubber material and synthetic rubber material (such as silicone rubber, urethane rubber, or acrylic rubber).

The spacers 29, as shown in FIG. 6, have a sheet shape extending along the plane of the main body portion 24a and the bottom portion 28a. The spacers 29 have a vertically elongated shape in plan view, with a long side direction and a short side direction aligned with the Y-axis direction and the X-axis direction, respectively. Thus, the spacers 29 are mounted with the long side direction and the short side direction aligned with the long side direction and the short side direction of the inverter covers 24, respectively. The outer size of the spacers 29 is smaller than that of the main body portion 24a of the inverter covers 24. The spacers 29 are disposed between the adjacent attaching portions 24c of the main body portion 24a of the inverter covers 24. Specifically, a pair of the spacers 29 is disposed across the central attaching portions 24c and between the attaching portions 24c at the ends in the Y-axis direction. With respect to the X-axis direction, the spacers 29 are disposed at the center of the main body portion 24a. Thus, the spacers 29 are disposed with their center substantially corresponding to the intersection point of the diagonals connecting the adjacent four attaching portions 24c with respect to the X-axis direction and the Y-axis direction. Each of the spacers 29 includes a pair of insertion holes 29a for the screws B by which the main body portion 24a and the bottom portion 28a are fixed with each other.

An operation of the present embodiment with the above structure will be described below. The liquid crystal display device 10 is manufactured by integrally assembling the liquid crystal panel 11 and the backlight unit 12, which are separately manufactured by the bezel 13 into the liquid crystal display module M, and then housing the liquid crystal display module M within the pair of exterior members 27 and 28.

Of the pair of exterior members 27 and 28, at least the second exterior member 28, specifically the bottom portion 28a thereof is fixed onto the inverter covers 24 and the reinforcing members 26, which are provided on the chassis 14 of the backlight unit 12 included in the liquid crystal display module M housed in the exterior members 27 and 28, as shown in FIG. 7. With respect to the reinforcing members 26, the pair of second plate portions 26b is, across the central second plate portion 26b fixed onto the bottom plate 14a of the chassis 14, directly fixed onto the bottom portion 28a in an abutting manner with the screws B. On the other hand, the inverter covers 24 are fixed onto the bottom plate 14a of the chassis 14 via the attaching portions 24c with the screws B, with the spacers 29 of rubber material interposed between the main body portion 24a and the bottom portion 28a. Thus, the spacers 29 are resiliently compressed between the main body portion 24a and the bottom portion 28a in an entirely and substantially evenly surface-to-surface manner. In addition, the spacers 29 are resiliently contacted with the main body portion 24a and the bottom portion 28a in a closely adhered state. In this way, the liquid crystal display module M is fixed onto the second exterior member 28. The second exterior member 28 is fixed onto the first exterior member 27 with their respective side portions 27b and 28b abutting on each other.

When power supply to thus manufactured liquid crystal display device 10 is turned on for use, the power supply board P supplies electric power. In response to the power supply from the power supply board P, drive power is supplied from the inverter boards 21 via the connectors 22 to the cold cathode tubes 18, while various signals for liquid crystal display are output from the control boards 25 to the liquid crystal panel 11, whereby an image can be displayed on the display surface of the liquid crystal panel 11. At the same time, the control boards 25 output a sound signal associated with the display image to the amplifier circuit, which is not shown. The signal amplified by the amplifier circuit is then output to the speakers SP in the first exterior member 27, and the speakers SP emit sound associated with the display image to the user (FIG. 1).

As the sound is emitted by the speakers SP, the sound causes vibration, which is transmitted from the first exterior member 27 to the second exterior member 28. If, as a result of the vibration, resonance is caused in the bottom portion 28a, which has the largest area of the second exterior member 28, noise such as buzzing noise may be produced. Particularly, vibration is easily caused in the fixed parts of the bottom portion 28a onto the inverter covers 24 because of the gap C from the main body portion 24a. In this respect, according to the present embodiment, the spacers 29 with a function of damping vibration are interposed between the bottom portion 28a and the inverter covers 24. Therefore, the vibration transmitted from the speakers SP to the bottom portion 28a of the second exterior member 28 can be damped in a preferred manner. Particularly, the fixed parts of the bottom portion 28a onto the inverter covers 24 can be made difficult to vibrate. The spacers 29 are made of rubber material, which is a kind of elastic material, and have a sheet shape extending along the bottom portion 24a and the main body portion 28a. Thus, the bottom portion 28a and the main body portion 24a of the inverter covers 24 can be insulated over a wide area from vibrating in a preferred manner, leading to a high anti-vibration effect. Further, the attaching portions 24c intermittently provided on the inverter covers 24 are individually attached to the chassis 14 while the spacers 29 are disposed at the intermediate position between the adjacent attaching portions 24c of the main body portion 24a of the inverter covers 24. Thus, the portion of the main body portion 24 that tends to vibrate can be effectively prevented from vibrating. In this way, the vibrations that may be caused in the bottom portion 28a of the second exterior member 28 and in the main body portion 24a of the inverter covers 24 can be effectively suppressed, and as a result, the development of noise such as buzzing noise can be suppressed.

As described above, the liquid crystal display device (display device) 10 according to the present embodiment is provided with the liquid crystal panel (display unit) 11 configured to display an image; the backlight unit (lighting unit) 12 including the cold cathode tubes (light sources) 18 and the chassis 14 housing the cold cathode tubes 18 and supplying light to the liquid crystal panel 11; and the second exterior member (exterior member) 28 housing the liquid crystal panel 11 and the backlight unit 12 and including the bottom portion 28a facing the chassis 14. On the surface of the chassis 14 facing the bottom portion 28a, a plurality of fixing members configured to fix the bottom portion 28a are provided. The fixing members include the inverter covers (first fixing members) 24 with the gap C from the bottom portion 28a, and the reinforcing members (second fixing members) 26 abutting on the bottom portion 28a. Between the inverter covers 24 and the bottom portion 28a, the spacers 29 damping vibration are provided.

Thus, the backlight unit 12 includes the cold cathode tubes 18 and the chassis 14 housing the cold cathode tubes 18, and is housed in the second exterior member 28 together with the liquid crystal panel 11 to which the light from the cold cathode tubes 18 is supplied. The bottom portion 28a of the second exterior member 28 is fixed onto the plurality of fixing members provided on the chassis 14. The plurality of fixing members include the inverter covers 24 with the gap C from the bottom portion 28a, and the reinforcing members 26 abutting on the bottom portion 28a. The reinforcing members 26 are directly fixed onto the bottom portion 28a in an abutting manner whereas the inverter covers 24 are fixed onto the bottom portion 28a with the gap C therebetween. Thus, the portions of the bottom portion 28a to which the inverter covers 24 are fixed tend to vibrate relatively easily, possibly resulting in noise. According to the present embodiment, the spacers 29 are interposed between the inverter covers 24 and the bottom portion 28a. Thus, even when vibration is caused in the parts of the bottom portion 28a to which the inverter covers 24 are fixed, for example, the vibration can be damped by the spacers 29. Thus, the development of noise by the vibration in the bottom portion 28a of the second exterior member 28 can be suppressed in a preferred manner. Further, the vibration that may be caused in the inverter covers 24 can also be damped by the spacers 29, and thereby the development of noise can be suppressed in a preferred manner.

The spacers 29 are separate components from the inverter covers 24 and the bottom portion 28a. In this way, the degree of freedom in selecting the material and the like with respect to the spacers 29 can be increased, and thereby the vibration damping function of the spacers 29 can be sufficiently enhanced.

The spacers 29 are made of elastic material. In this way, vibration of the inverter covers 24 and the bottom portion 28a can be prevented by the spacers 29 of elastic material, which leads to efficient damping of the vibration.

The spacers 29 are made of rubber material. In this way, the cost for the material of the spacers 29 can be lowered. Particularly, high anti-vibration effect can be obtained for lower frequencies of vibration.

The spacers 29 have a sheet shape extending along the bottom portion 28a. By thus employing the sheet shape extending along the bottom portion 28a for the spacers 29, the vibration that may be caused in the bottom portion 28a can be damped in a preferred manner over a large area, and thereby the development of noise can be prevented in a more preferable manner.

The inverter covers 24 have an elongated shape and the spacers 29 also have an elongated shape with their long side directions aligned with each other. In this way, the vibration that may be caused in the elongated inverter covers 24 can be damped in a preferred manner by the similarly elongated spacers 29 with the long side direction aligned with that of the inverter covers 24.

The backlight unit 12 includes the inverter boards (power supply boards) 21 between the chassis 14 and the bottom portion 28a and supplying drive power to the cold cathode tubes 18; and the inverter covers (board covers) 24 covering the inverter boards 21 and attached on the chassis 14. The inverter covers 24 constitute the first fixing members and are attached with the spacers 29 disposed between with the bottom portion 28a. Because the inverter covers 24 are attached to the chassis 14 to cover the inverter boards 21, relatively large areas of the inverter covers 24 are not fixed onto the chassis 14, resulting in an increased tendency for vibration. According to the present embodiment, the inverter covers 24 constitute the first fixing members fixed onto the bottom portion 28a via the spacers 29. Thus, particularly the vibration that may be caused in the inverter covers 24 can be suppressed in a preferred manner, and thereby the development of noise can be more effectively suppressed.

The inverter covers 24 include the attaching portions 24c for the chassis 14 at the outer ends, while the spacers 29 are disposed at the center of the inverter covers 24 spaced apart from the attaching portions 24c. Because the outer ends of the inverter covers 24 are attached to the chassis 14 via the attaching portions 24c but the center of the inverter covers 24 is away from the attaching portions 24c and not fixed onto the chassis 14, vibration tends to be caused at the center. According to the present embodiment, the spacers 29 are disposed at the center of the inverter covers 24 away from the attaching portions 24c, and thereby the vibration that may be caused in the inverter covers 24 can be more effectively suppressed.

A plurality of the attaching portions 24c is intermittently provided at the outer ends of the inverter covers 24, while the spacers 29 are disposed at the intermediate position of the adjacent attaching portions 24c on the inverter covers 24. In this way, although vibration tends to be caused relatively easily in the intermediate position of the adjacent attaching portions 24c of the inverter covers 24, the vibration that may be caused in the inverter covers 24 can be further effectively suppressed by the spacers 29 disposed at the intermediate position.

On the inverter boards 21, the step-up transformer TR is mounted. Generally, the inverter boards 21 with the transformer TR, which is a relatively large electronic component, is used, the space between the inverter covers 24 and the chassis 14 tends to be increased, resulting in a greater tendency for vibration in the inverter covers 24. According to the present embodiment, the vibration that may be caused in the inverter covers 24 can be effectively suppressed by the spacers 29.

A plurality of the cold cathode tubes 18, which has a linear shape, is arranged parallel to each other, with their axis directions aligned with each other in the chassis 14. The inverter boards 21 and the inverter covers 24 extend along a direction intersecting with the axis direction of the cold cathode tubes 18 while traversing the plurality of cold cathode tubes 18. In this way, the size of the inverter boards 21 and the inverter covers 24 tends to be increased and, as a result, vibration tends to be caused in the inverter covers 24 more easily. However, according to the present embodiment, the vibration that may be caused in the inverter covers 24 can be effectively suppressed by the spacers 29.

The cold cathode tubes 18 have a linear shape and include the outer leads (external connecting portions) 18b at the end portions. At the ends of the chassis 14, the connectors (connecting components) 22 configured to electrically connect the outer leads 18b to the inverter boards 21 are attached, while the inverter boards 21 and the inverter covers 24 are disposed adjacent to the connectors 22. In this way, the inverter boards 21 disposed adjacent to the connectors 22 can be electrically connected to the outer leads 18b disposed at the end portions of the cold cathode tubes 18 by the connectors 22 attached at the ends of the chassis 14, to supply drive power to the cold cathode tubes 18.

The reinforcing members extend along one side of the chassis 14 and attached to the chassis 14. The reinforcing members 26 constitute the second fixing members. In this way, the chassis 14 can be reinforced by the reinforcing members 26 extending along one side of the chassis 14, and thereby the deformation of the chassis 14, such as warping, can be made difficult to occur. In addition, the reinforcing members 26 constitute the second fixing members and are directly fixed onto the bottom portion 28a of the second exterior member 28 in an abutting manner. Thus, the bottom portion 28a as well as the chassis 14 can be reinforced, and thereby the development of vibration in the bottom portion 28a is made difficult to occur.

The reinforcing members 26 are arranged closer to the center than the inverter covers 24 on the chassis 14 and the bottom portion 28a. In this way, because deformation, such as warping, of the chassis 14 and the bottom portion 28a tends to occur more at the center than at the ends, the chassis 14 and the bottom portion 28a can be more effectively reinforced by the reinforcing members 26 provided closer to the center than the inverter covers 24.

The reinforcing members 26 extend over the entire length of one side of the chassis 14. In this way, the chassis and the bottom portion 28a can be more effectively reinforced.

The light sources are the cold cathode tubes 18. In this way, longer operating life can be achieved, for example, and lighting control can be performed easily.

The display unit is the liquid crystal panel 11 including a pair of substrates 11a and 11b between which liquid crystal is enclosed. In this way, the display panel can be applied to various purposes, such as for television or personal computer display, particularly for large screens.

Second Embodiment

A second embodiment of the present invention will be described with reference to FIG. 8. In the second embodiment, the material of spacers 129 is modified from the first embodiment. Redundant description of structures, operations, and effects similar to those of the first embodiment will be omitted.

Figure 8:
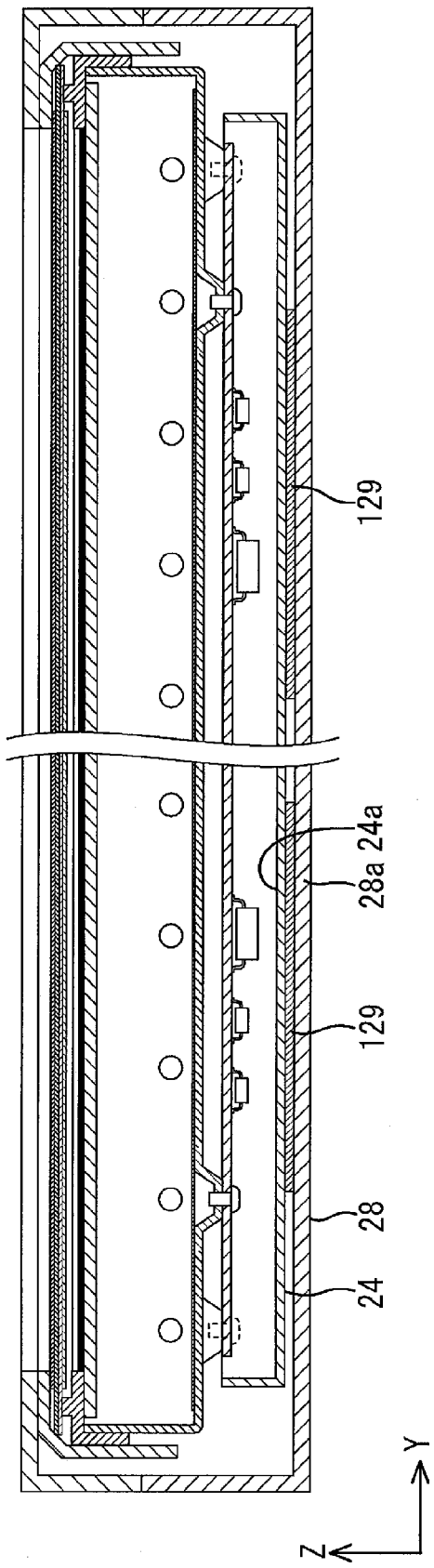
FIG. 8 is a cross sectional view of a liquid crystal display device according to a second embodiment of the present invention taken along the short side direction thereof.

As shown in FIG. 8, the spacers 129 according to the present embodiment are formed from a so-called double-sided tape, i.e., a sheet-shaped base member with adhesive layers on both sides. The adhesive layers on both sides of the spacers 129 are affixed to the main body portion 24a of the inverter covers 24 and the bottom portion 28a of the second exterior member 28, respectively. In this way, the main body portion 24a and the bottom portion 28a can be affixed with each other without using screws. The base member of the spacers 129 is made of an elastic synthetic resin material such as acrylic foam, or an elastic rubber material such as butyl rubber, for example. Thus, the spacers 129 include the base member of the elastic base material, and are adhesively and strongly fixed onto the main body portion 24a and the bottom portion 28a over substantially the entire surfaces. Therefore, an enhanced anti-vibration effect can be obtained.

Third Embodiment

A third embodiment of the present invention will be described with reference to FIG. 9. In the third embodiment, attaching portions 224c of inverter covers 224 and spacers 229 are modified from the first embodiment. Redundant description of structures, operations, and effects similar to those of the first embodiment will be omitted.

Figure 9:
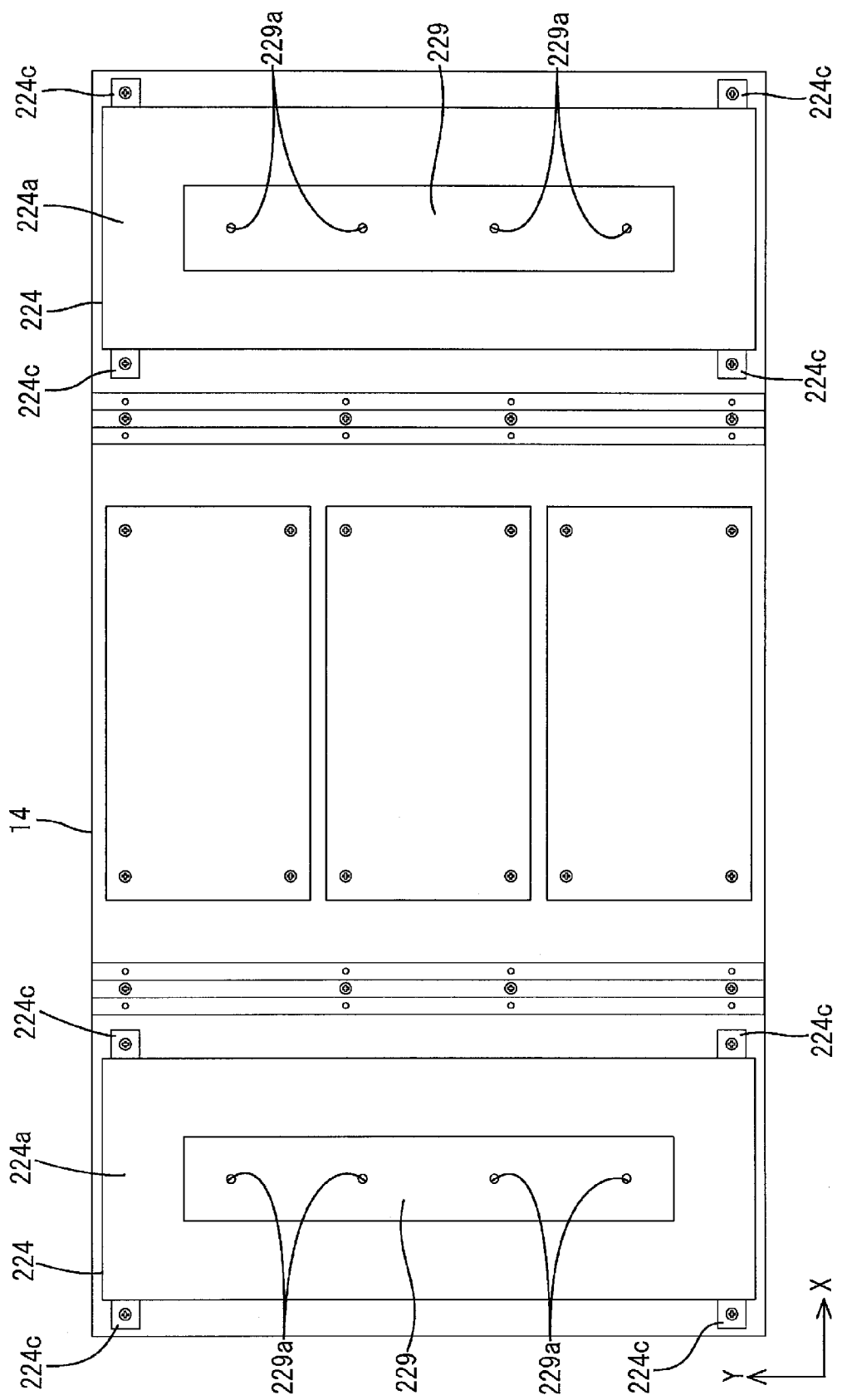
FIG. 9 is a bottom view illustrating an arrangement of a power supply board, control boards, reinforcing members, inverter covers, and spacers on a chassis of a liquid crystal display device according to a third embodiment of the present invention.

According to the present embodiment, as shown in FIG. 9, the inverter covers 224 are attached to the chassis 14 by a total of four attaching portions 224c provided at the ends of the inverter covers 224 in the long side direction. On the other hand, the spacers 229 are disposed at an intermediate position between the adjacent attaching portions 224c in the X-axis direction and the Y-axis direction. Namely, the spacers 229 are disposed concentrically with a main body portion 224a, with a length dimensioned to cover most of the central portion of the main body portion 224a by the spacers 229. The length dimension of the spacers 229 is twice or more as large as that of the spacers 29 according to the first embodiment. Thus, the contact area with the main body portion 224 is relatively large, and thereby a greater anti-vibration effect can be obtained. Each of the spacers 229 has four insertion holes 229a arranged at equal intervals along the long side direction (Y-axis direction). Through the insertion holes 229a, the screws B for fixing the main body portion 224a onto the bottom portion 28a can be inserted.

Fourth Embodiment

A fourth embodiment of the present invention will be described with reference to FIG. 10. According to the third embodiment, spacers 329 are integrally formed with an inverter cover 324. Redundant description of structures, operations, and effects similar to those of the first embodiment will be omitted.

Figure 10:
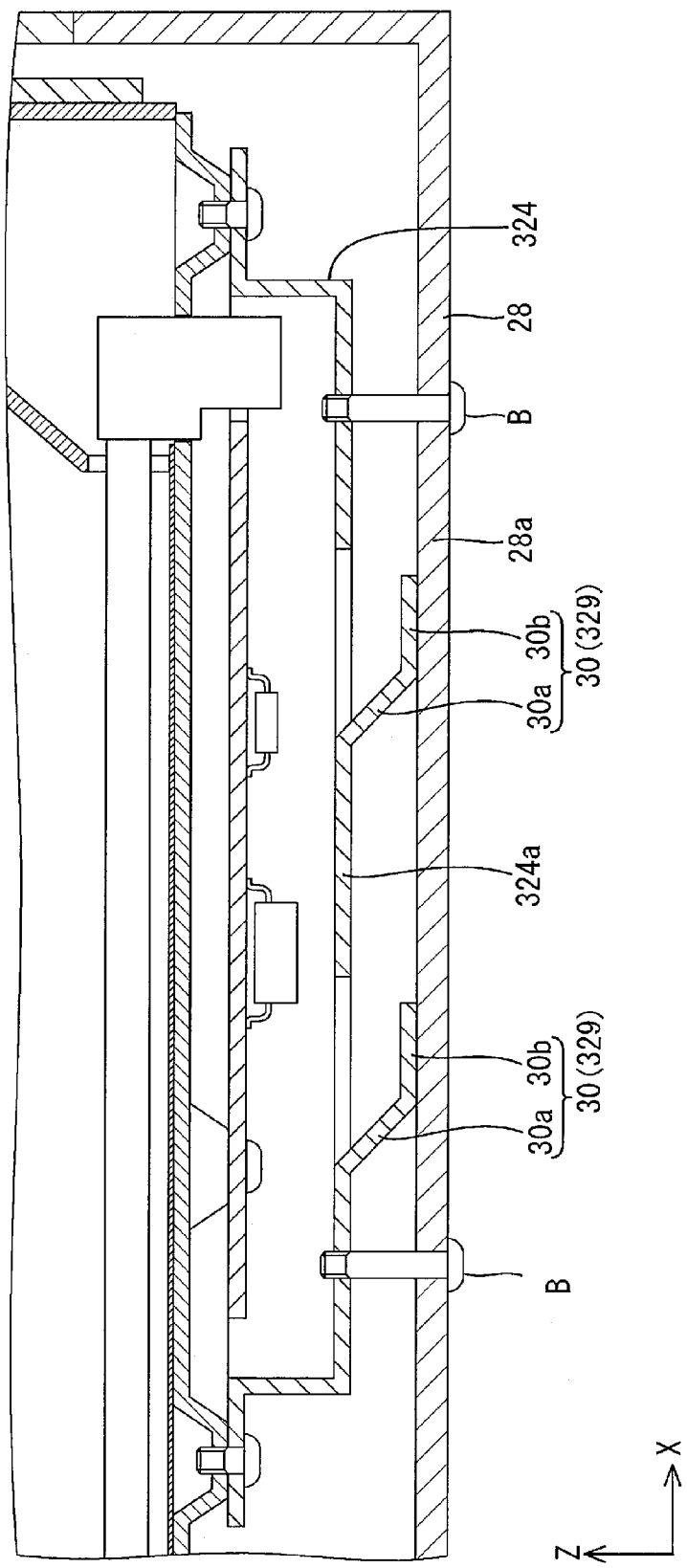
FIG. 10 is an enlarged cross sectional view of main parts including spacers according to a fourth embodiment of the present invention.

According to the present embodiment, as shown in FIG. 10, the inverter cover 324 has leaf-spring-shaped elastic parts 30 integrally formed therewith. The elastic parts 30 constitute the spacers 329. The elastic parts 30 include an inclined proximal portion 30a rising from a main body portion 324a toward the bottom portion 28a of the second exterior member 28, and a distal portion 30b extending parallel to the bottom portion 28a and abutting on the bottom portion 28a. The elastic parts 30 can be elastically deformed as a whole with respect to the Z-axis direction. As the elastic parts 30 are elastically deformed while being abutted on the bottom portion 28a, vibration of the bottom portion 28a and the main body portion 324a can be absorbed to be damped. According to the present embodiment, the screws B which is to be fixed onto the main body portion 324a at the position without the elastic parts 30 are shown. However, the screws B may be directly fixed onto the distal portion 30b of the elastic parts 30.

As described above, according to the present embodiment, the spacers 329 are integrally provided on at least one of the inverter cover 324 and the bottom portion 28a (inverter cover 324). In this way, the spacers 329 can be disposed at an appropriate position.

The spacers 329 have a spring shape protruding from at least one of the inverter cover 324 and the bottom portion 28a (e.g. the inverter cover 324) toward the other one of the inverter cover 324 and the bottom portion 28a (e.g. the bottom portion 28a) and being in contact therewith. In this way, because the spacers 329 in contact with the other one of the inverter cover 324 and the bottom portion 28a have a spring shape, vibration can be damped by the resilience of the spacers 329 in a preferred manner.

While the forth embodiment of the present invention has been described above, the present invention is not limited to the embodiment and may include the following modifications. In the following modifications, components similar to those of the embodiment will be designated by similar reference signs and their description and illustration may be omitted.

First Modification of the Forth Embodiment

A first modification of the forth embodiment will be described with reference to FIG. 11. In the present modification, elastic parts 31 are provided also on the second exterior member 28.

Figure 11:
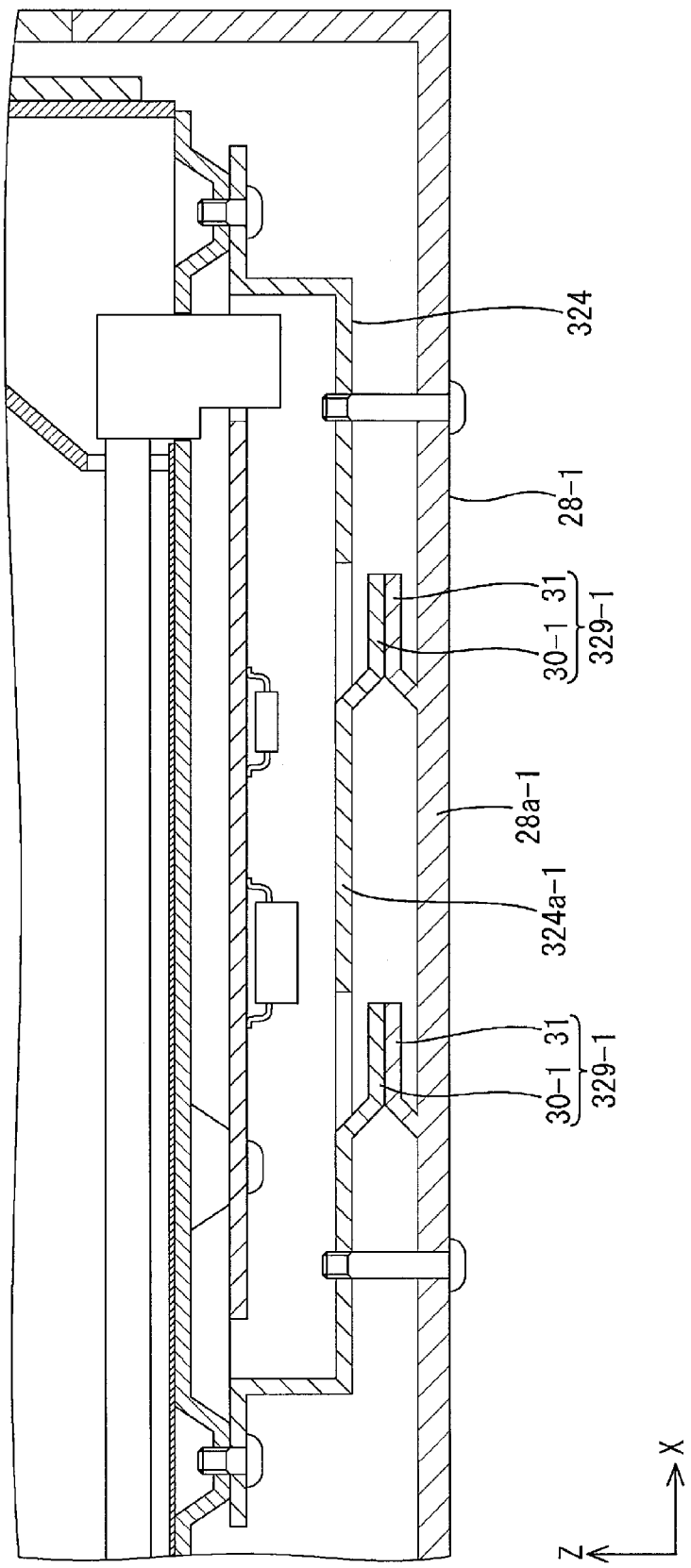
FIG. 11 is an enlarged cross sectional view of main parts including spacers according to a first modification of the present invention.

As shown in FIG. 11, a bottom portion 28a-1 of a second exterior member 28-1 according to the present modification has the elastic parts 31 protruding toward an inverter cover 324-1 and abutting on elastic parts 30-1 of the inverter cover 324-1. The pair of elastic parts 30-1 and 31 constitutes a spacer 329-1. Also in this configuration, vibration can be damped in a preferred manner by the resilience of the pair of elastic parts 30-1 and 31.

Second Modification of the Forth Embodiment

A second modification of the forth embodiment will be described with reference to FIG. 12 or 13. In the present modification, elastic parts 30-2 include an auxiliary elastic material 32.

Figure 12:
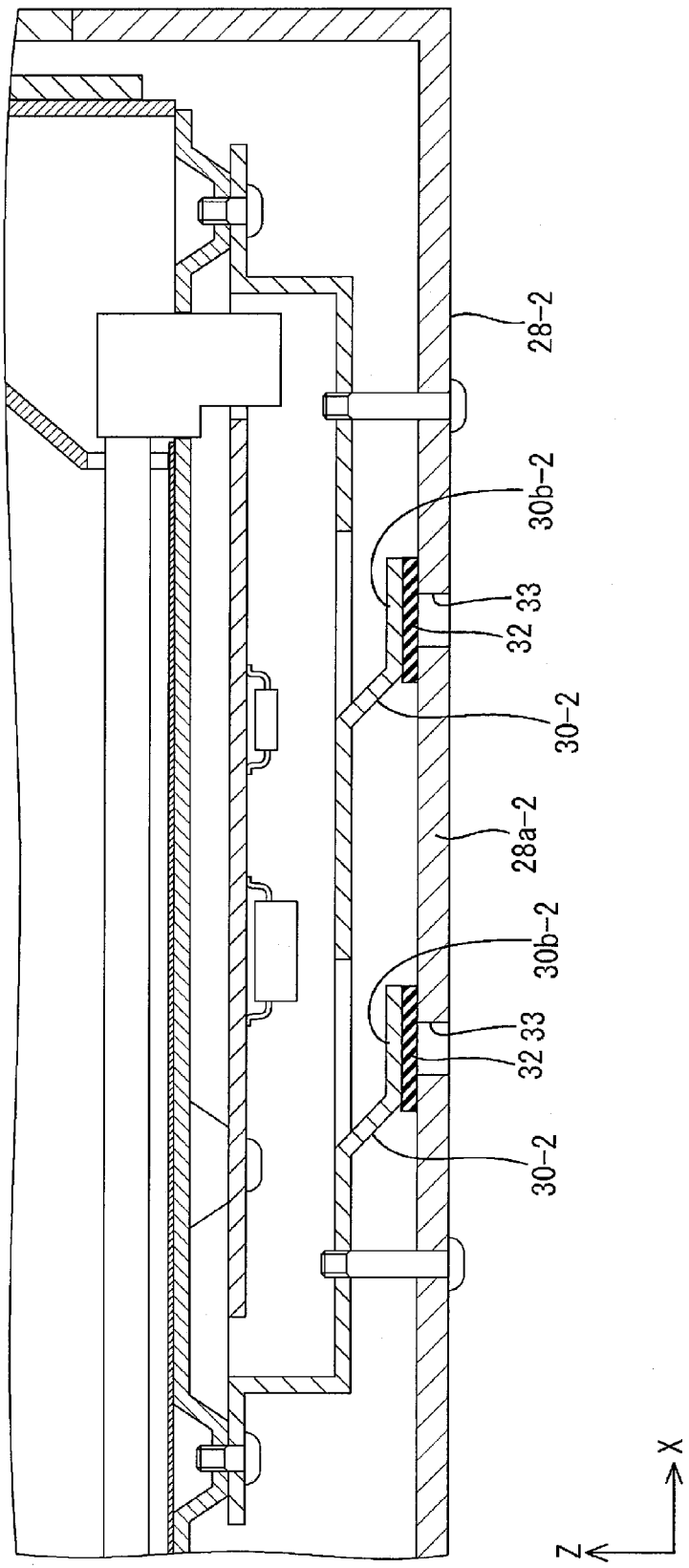
FIG. 12 is an enlarged cross sectional view of main parts including spacers according to a second modification of the present invention.
Figure 13:
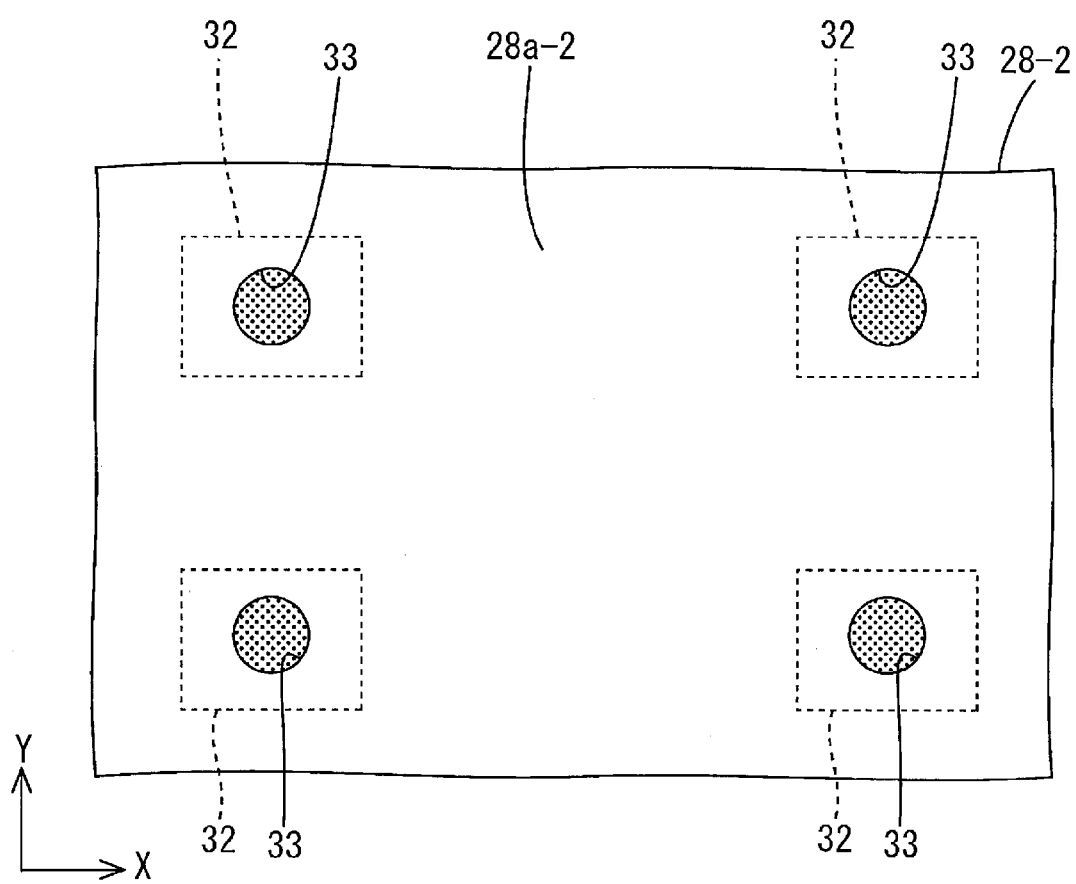
FIG. 13 is an enlarged bottom view of the end portion of the liquid crystal display device in the long side direction thereof.

As shown in FIG. 12, according to the present modification, the auxiliary elastic material 32 of rubber material is attached to a distal portion 30b-2 of the elastic parts 30-2. The auxiliary elastic material 32 is abutted on a bottom portion 28a-2 of a second exterior member 28-2. Because the elastic parts 30-2 are held to the bottom portion 28a-2 via the auxiliary elastic material 32, vibration can be damped in a preferred manner by the resilience of the elastic parts 30-2 and the resilience of the auxiliary elastic material 32. In addition, the bottom portion 28a-2 of the second exterior member 28-2 has hole portions 33 penetrating therethrough at positions overlapping with the auxiliary elastic material 32 in plan view, as shown in FIGS. 12 and 13. In this way, the auxiliary elastic material 32 can be visually externally recognized through the hole portions 33. Thus, the attaching position of the auxiliary elastic material 32 can be examined, or the presence or absence of the auxiliary elastic material 32 can be confirmed, for example. Examples of the auxiliary elastic material 32 are natural rubber material and synthetic rubber material (such as silicone rubber, urethane rubber, and acrylic rubber).

Third Modification of the Forth Embodiment

A third modification of the forth embodiment will be described with reference to FIG. 14 or 15. In the present modification, elastic parts 34 are integrally formed with a second exterior member 28-3.

Figure 14:
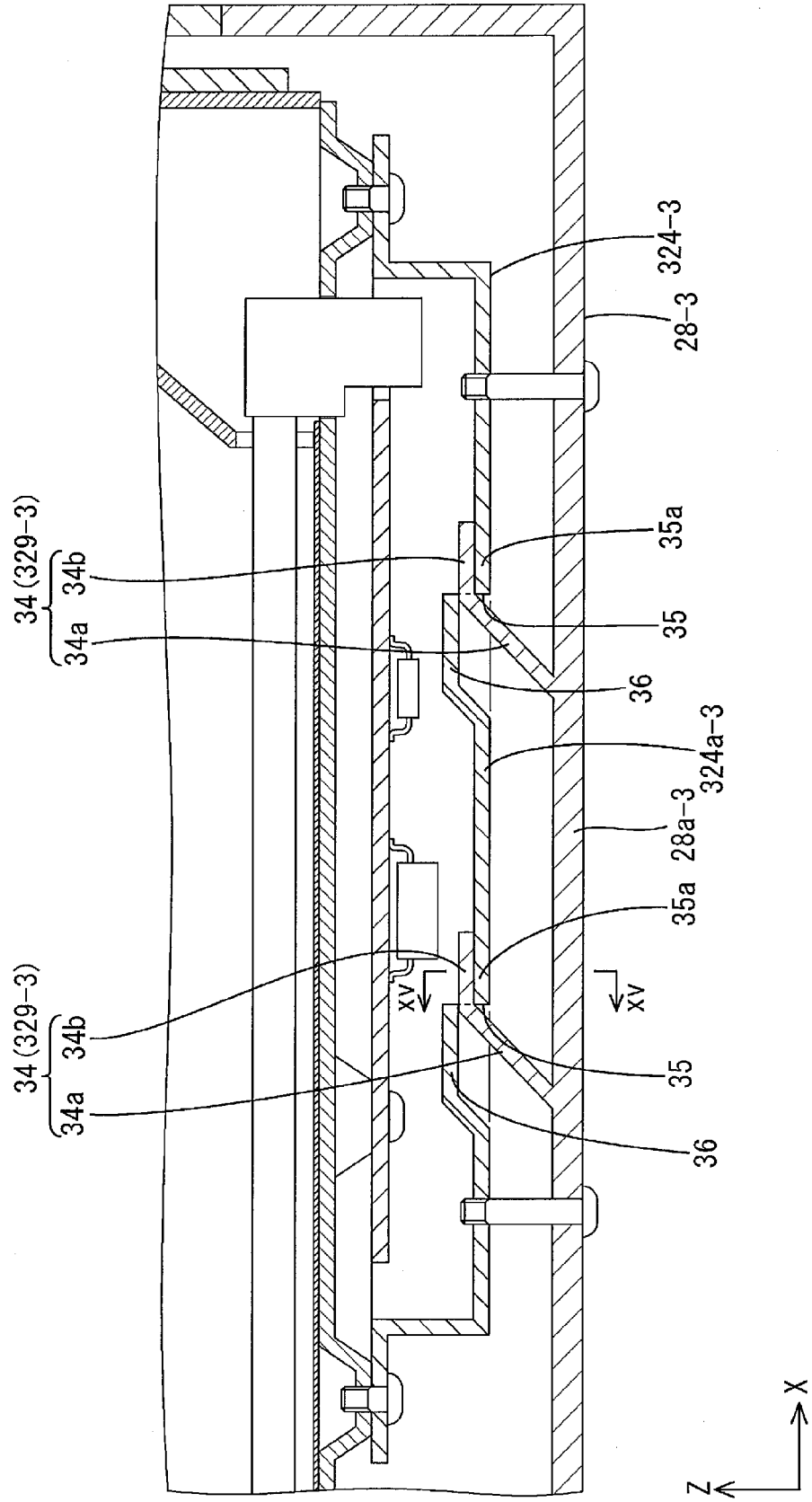
FIG. 14 is an enlarged cross sectional view of main parts including spacers according to a third modification of the fourth embodiment.
Figure 15:
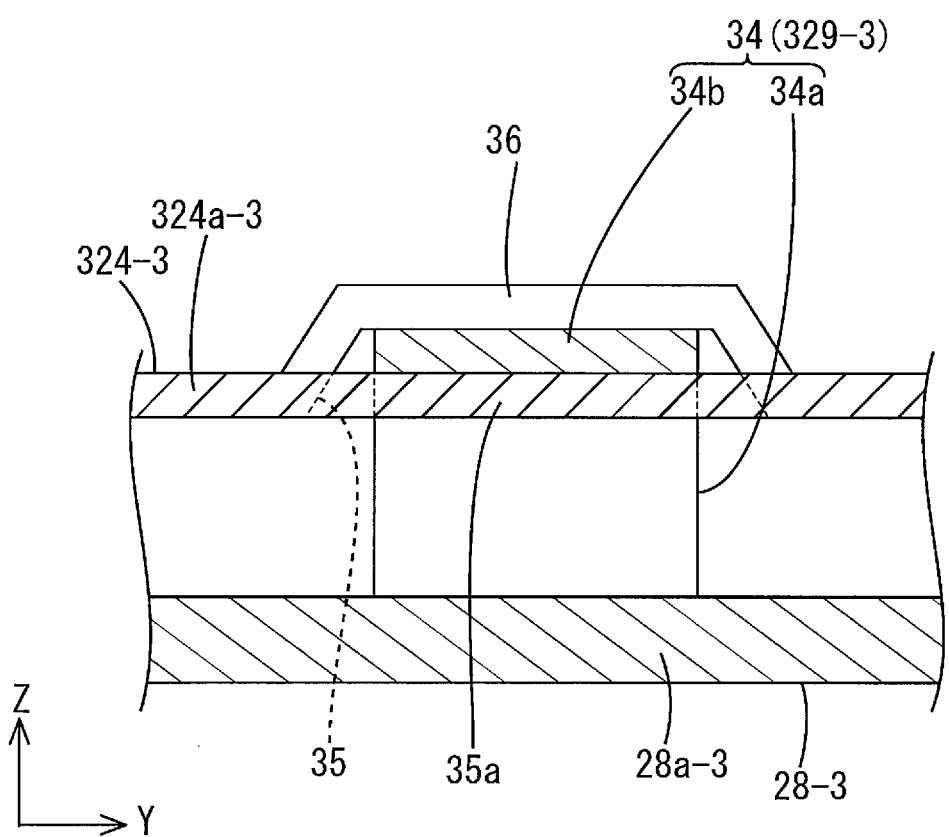
FIG. 15 is a cross sectional view taken along line xv-xv of FIG. 14.

According to the present modification, as shown in FIG. 14, the elastic parts 34 are integrally formed with a bottom portion 28a-3 of the second exterior member 28-3. The elastic parts 34, which constitute spacers 329-3, include an inclined proximal portion 34a rising from the bottom portion 28a-3 toward an inverter cover 324-3, and a distal portion 34b extending parallel to a main body portion 324a-3 and abutting on the main body portion 324a-3. The elastic parts 34 are configured to be resiliently deformed as a whole with respect to the Z-axis direction. On the other hand, the main body portion 324a-3 of the inverter cover 324-3 has insertion holes 35 into which the elastic parts 34 can be inserted. By inserting and sliding the elastic parts 34 in the insertion holes 35 with respect to the main body portion 324a-3 along the X-axis direction, the distal portion 34b can be locked on the edges of the insertion holes 35. Thus, the second exterior member 28-3 can be maintained in a fixed state with respect to the inverter cover 324-3 without using screws. The insertion holes 35 include a locked part 35a at the peripheral edges, on which the distal portion 34b is locked. The insertion holes 35 include a bulge portion 36 at the peripheral edges excluding the locked part 35a, which is formed, such as by drawing, to bulge inwardly (opposite to the bottom portion 28a-3). As shown in FIGS. 14 and 15, the bulge portion 36 has a substantially bag-like shape with an opening toward the locked part 35a such that the distal portion 34b of the elastic parts 34 can be received therein. The bulge portion 36 is configured to guide the insertion and sliding movement of the elastic parts 34 with respect to the insertion holes 35.

As described above, according to the present modification, the elastic parts 34 constituting the spacers 329-3 are configured to be locked on the inverter cover (the abutted side) 324-3. In this way, the bottom portion 28a-3 and the inverter cover 324-3 can be fixed with each other by the elastic parts 34 locked on the inverter cover 324-3. Thus, the number of components can be decreased, for example.

Forth Modification of the Forth Embodiment

A forth modification of the forth embodiment will be described with reference to FIG. 16. In the present modification, elastic parts 34-4 are modified from the third modification.

Figure 16:
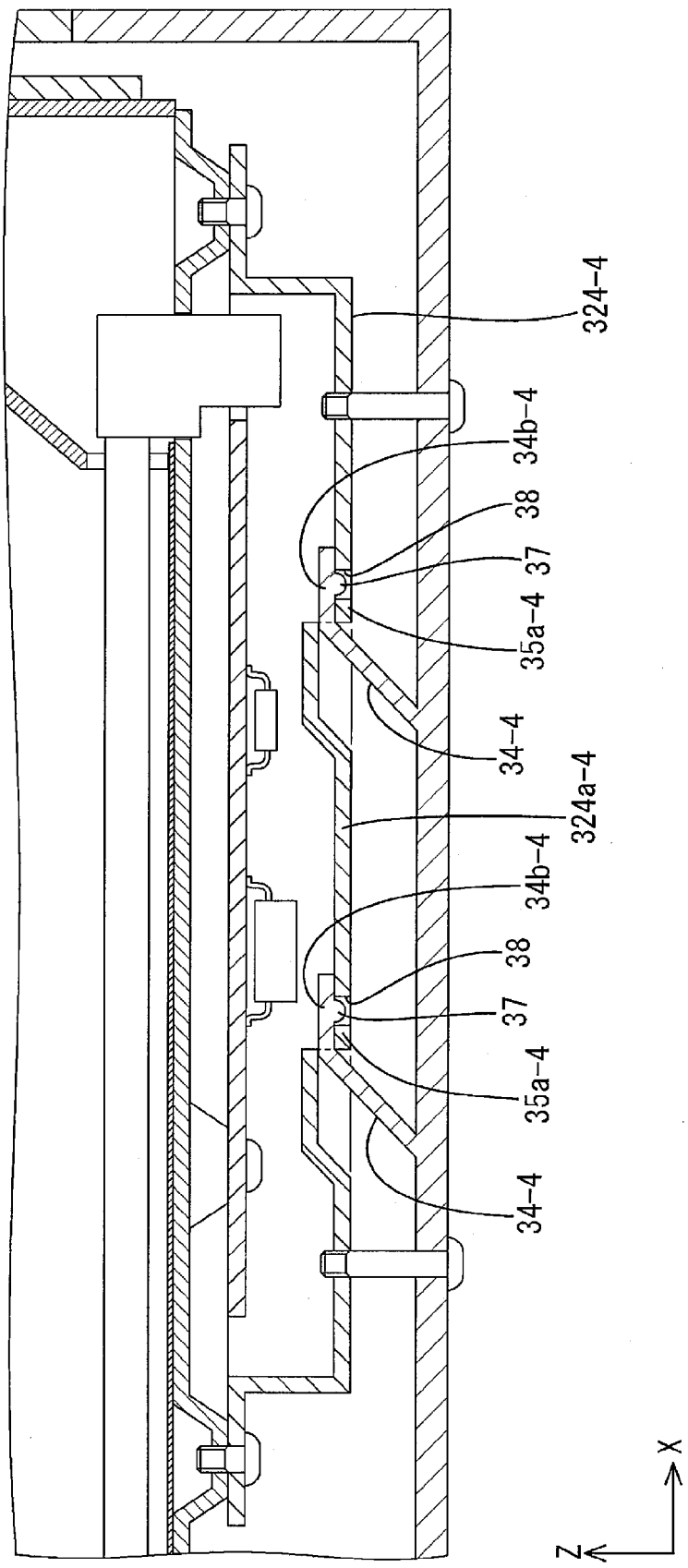
FIG. 16 is an enlarged cross sectional view of main parts including spacers according to a fourth modification of the fourth embodiment.

According to the fourth modification, as shown in FIG. 16, a distal portion 34b-4 of the elastic parts 34-4 has a retaining protrusion 37, while a locked part 35a-4 of a main body portion 324a-4 of an inverter cover 324-4 has a retaining hole portion 38 into which the retaining protrusion 37 can be fit. As the retaining protrusion 37 is locked on the edges of the retaining hole portion 38, the elastic parts 34-4 are less likely to be getting out of place.

Fifth Embodiment

A fifth embodiment of the present invention will be described with reference to FIG. 17 or 18. In the fifth embodiment, spacers 429 have a modified shape, for example. Redundant description of structures, operations, and effects similar to those of the first embodiment will be omitted.

Figure 17:
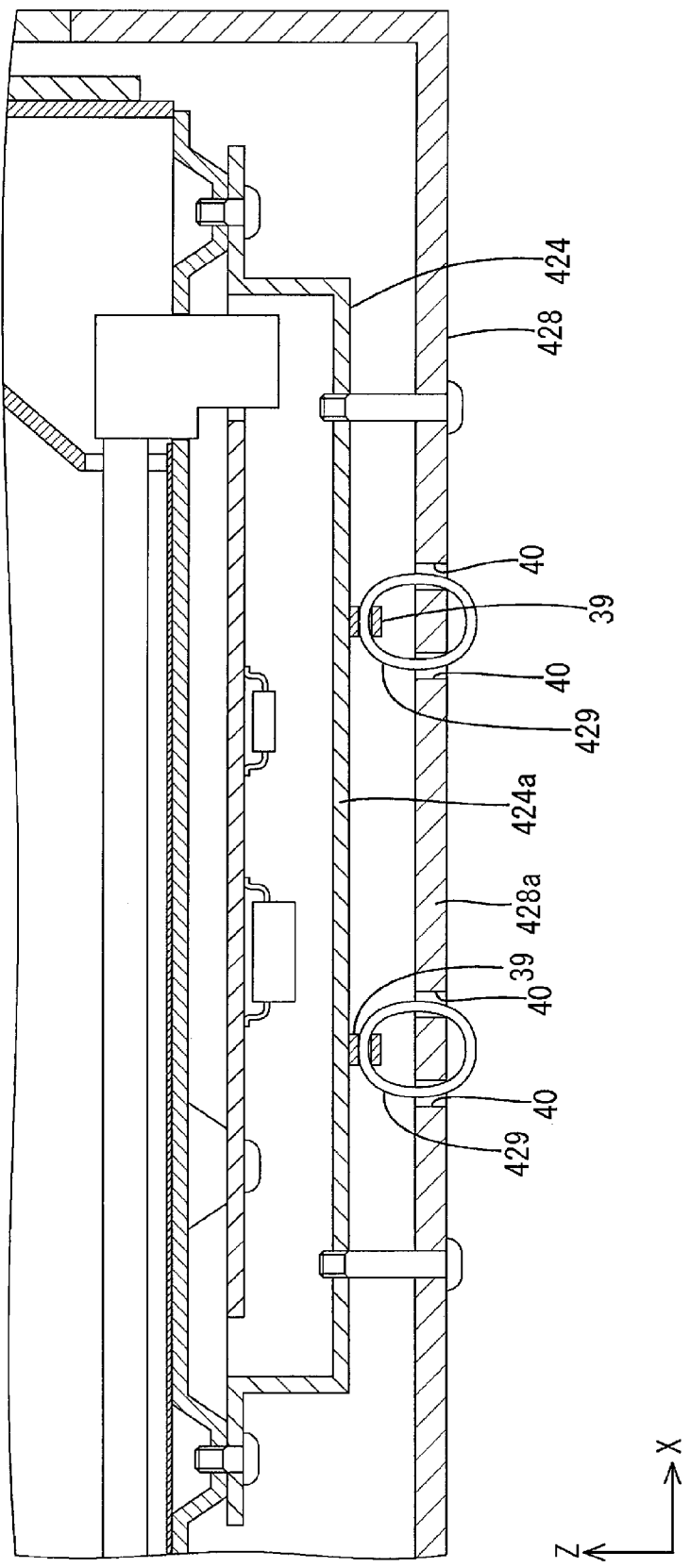
FIG. 17 is an enlarged cross sectional view of main parts including spacers according to a fifth embodiment of the present invention.
Figure 18:
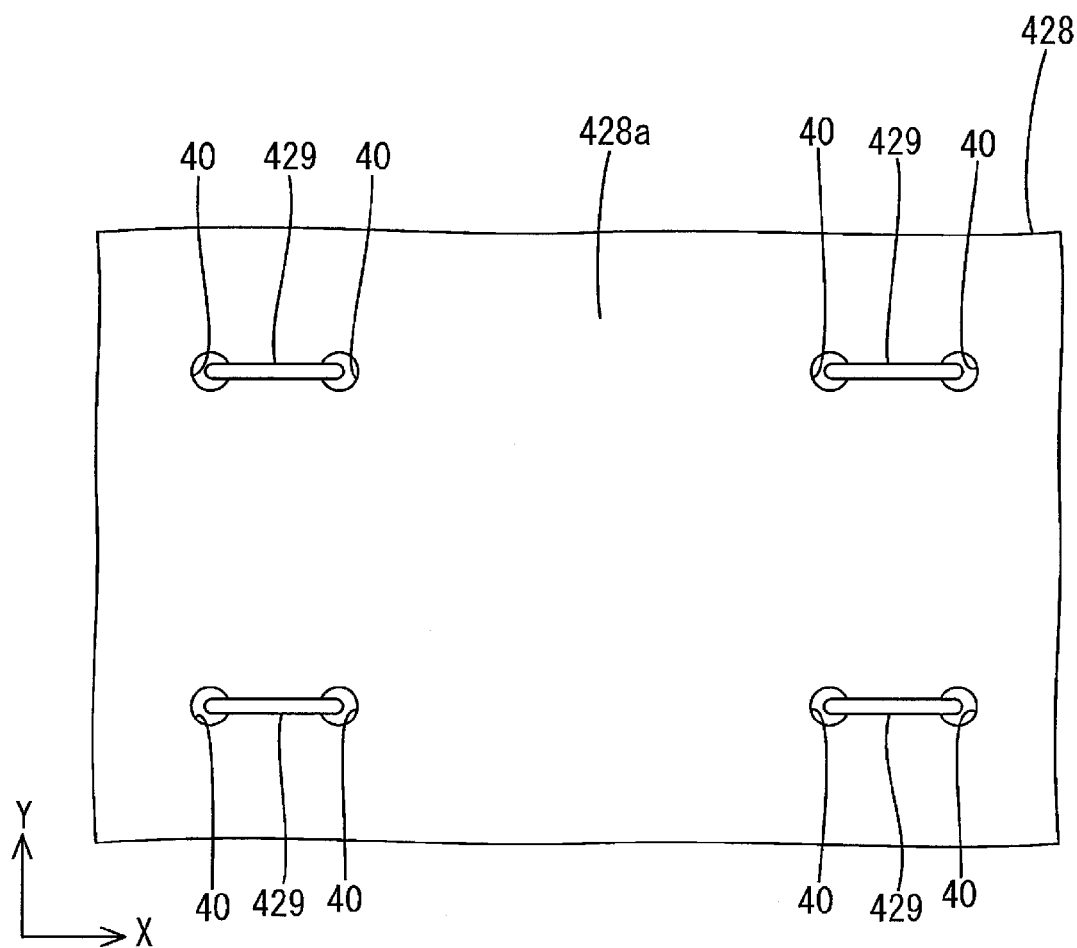
FIG. 18 is an enlarged bottom view of the end portion of the liquid crystal display device in the long side direction thereof.

According to the present embodiment, as shown in FIGS. 17 and 18, the spacers 429 are made of rubber material and have a ring (circular) shape. A portion of each spacer 429 is attached to an inverter cover 424 and another portion opposite the portion attached to the inverter cover 424 is attached to a second exterior member 428. A main body portion 424a of the inverter cover 424 has attaching portions 39 formed thereon. The attaching portions 39 include a through hole for the ring-shaped spacers 429. A bottom portion 428a of the second exterior member 428 has a pair of through hole portions 40 for the spacers 429. The spacers 429 are passed through the attaching portions 39 and the hole portions 40 in a slightly resiliently drawn manner such that the spacers 429 can absorb vibration from the main body portion 424a and the bottom portion 428a well. Examples of the material of the spacers 429 are natural rubber material and synthetic rubber material (such as silicone rubber, urethane rubber, and acrylic rubber).

Sixth Embodiment

A sixth embodiment of the present invention will be described with reference to FIG. 19. According to the sixth embodiment, spacers 529 are integrally provided on an inverter cover 524, and the spacers 529 are engaged with a second exterior member 428. Redundant description of structures, operations, and effects similar to those of the first embodiment will be omitted.

Figure 19:
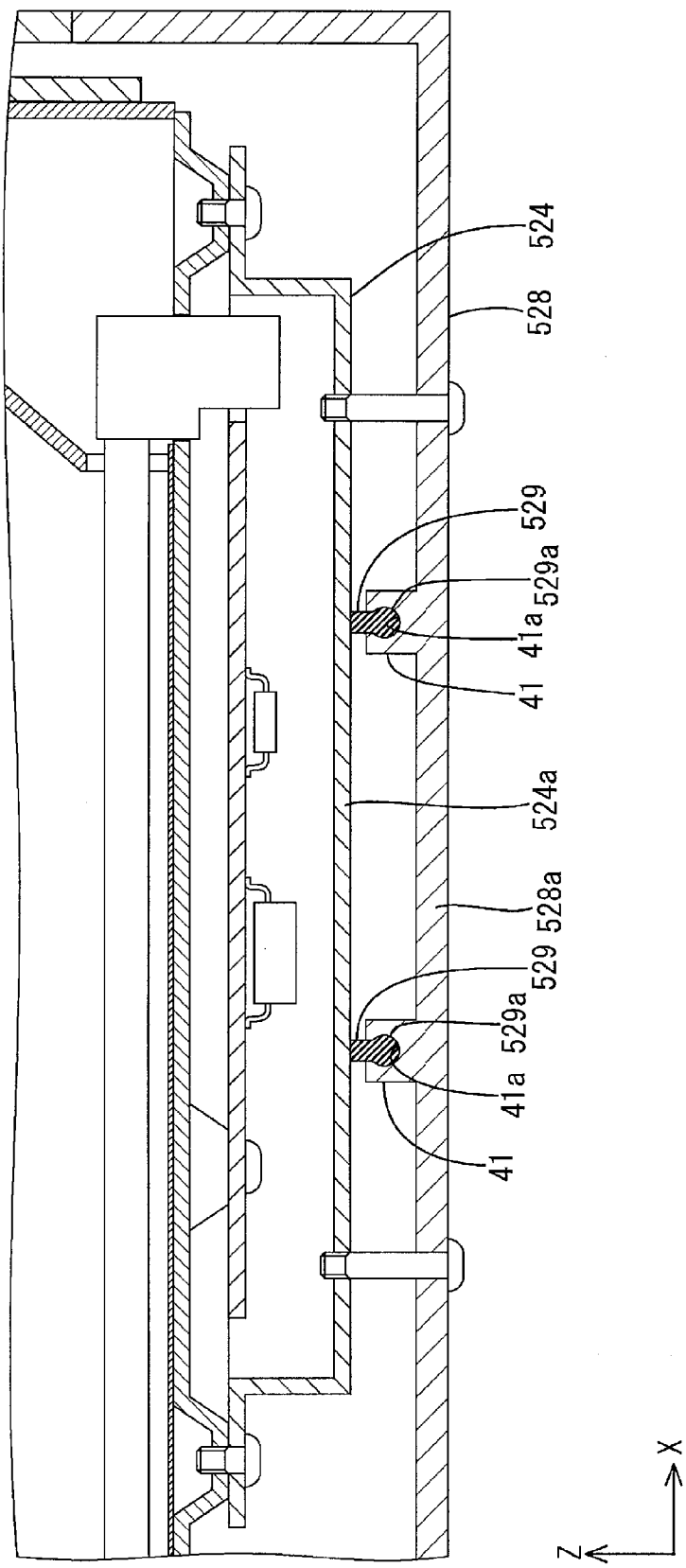
FIG. 19 is an enlarged cross sectional view of main parts including spacers according to a sixth embodiment of the present invention.

According to the present embodiment, as shown in FIG. 19, the spacers 529 are made of rubber material and integrally fixedly attached to a main body portion 524a of the inverter cover 524 by an adhesive, for example. The spacers 529 protrude from the main body portion 524a toward the second exterior member 528. The spacers 529 include a protruding distal portion 529a in the shape of a bulge with a substantially circular cross section. On the other hand, a bottom portion 528a of the second exterior member 528 includes an integrally formed fixing portion 41 protruding toward the inverter cover 524. The fixing portion 41 has an engaging recess 41a conforming to the outer shape of the protruding distal portion 529a of the spacers 529. As the protruding distal portion 529a of the spacers 529 is engaged in the engaging recess 41a, the inverter cover 524 and the second exterior member 528 can be fixed with each other without using screws. Examples of the material of the spacers 529 are natural rubber material and synthetic rubber material (such as silicone rubber, urethane rubber, and acrylic rubber). Apart from the above configuration, the spacers 529 may be provided on the second exterior member 528 while the fixing portion 41 may be provided on the inverter cover 524. It is also possible to reverse the concave-convex relationship between the spacers 529 and the fixing portion 41.

Seventh Embodiment

A seventh embodiment of the present invention will be described with reference to FIG. 20. In the seventh embodiment, fixing portions 641 are modified from the sixth embodiment. Redundant description of structures, operations, and effects similar to those of the sixth embodiment will be omitted.

Figure 20:
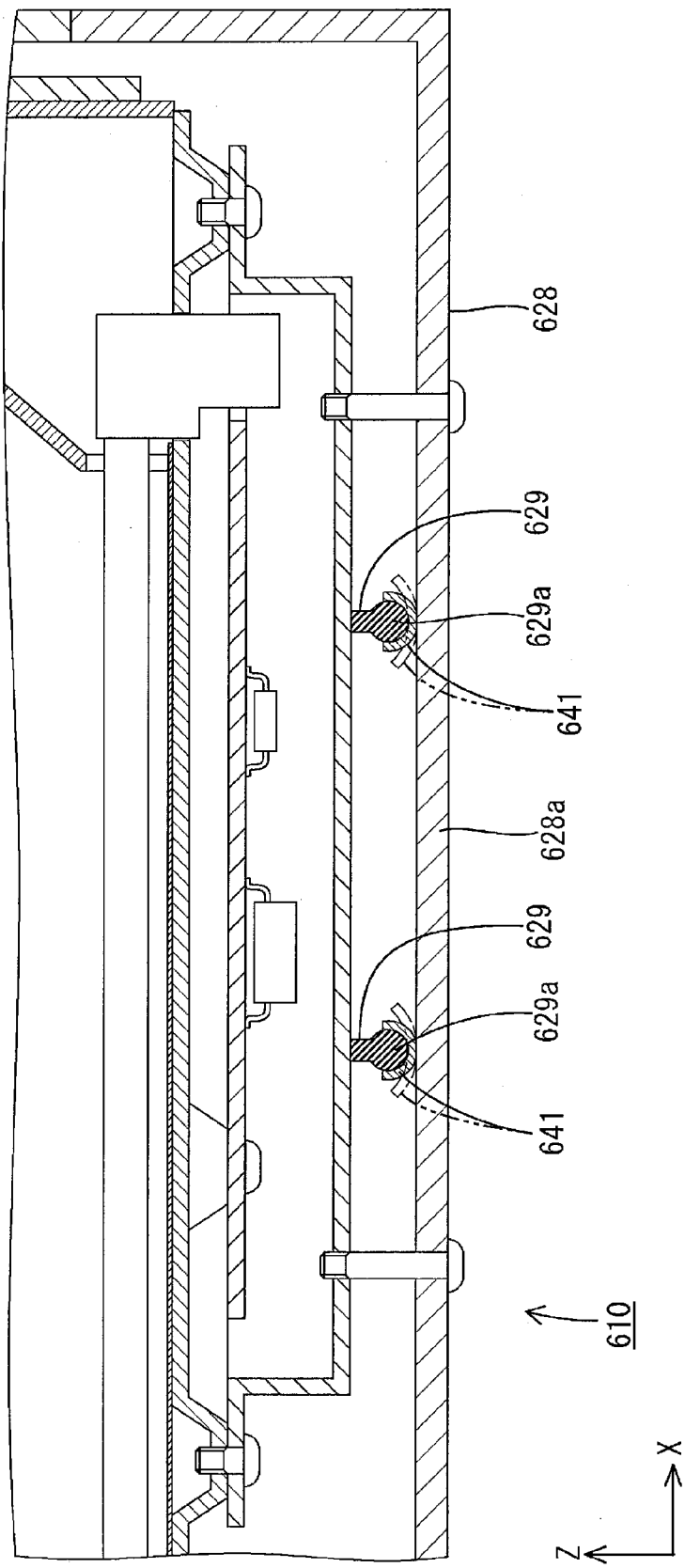
FIG. 20 is an enlarged cross sectional view of main parts including spacers according to a seventh embodiment of the present invention.

According to the present embodiment, as shown in FIG. 20, the fixing portions 641 are made of a shape memory alloy with the transformation point above normal temperature. The fixing portions 641 are integrally fixed onto a bottom portion 628a of a second exterior member 628. The fixing portions 641 have a substantially U-shaped cross section and are deformed such that a protruding distal portion 629a of spacers 629 of rubber material can be surrounded and sandwiched by the fixing portions 641 in an embracing manner. The fixing portions 641 are configured to return to an open shape (indicated by the two-dot chain line in FIG. 20) in a temperature environment exceeding the transformation point, with the distance between the distal ends thereof becoming greater than the outer dimension of the protruding distal portion 629a of the spacers 629. Thus, when a liquid crystal display device 610 is disassembled for repair or discarding, for example, the fixed state of the fixing portions 641 with respect to the spacers 629 can be removed by heating the fixing portions 641 to the temperature environment exceeding the transformation point. In this way, the second exterior member 628 can be easily detached.

Eighth Embodiment

An eighth embodiment of the present invention will be described with reference to FIG. 21. According to the eighth embodiment, magnets 42 are used as spacers 729. Redundant description of structures, operations, and effects similar to those of the first embodiment will be omitted.

Figure 21:
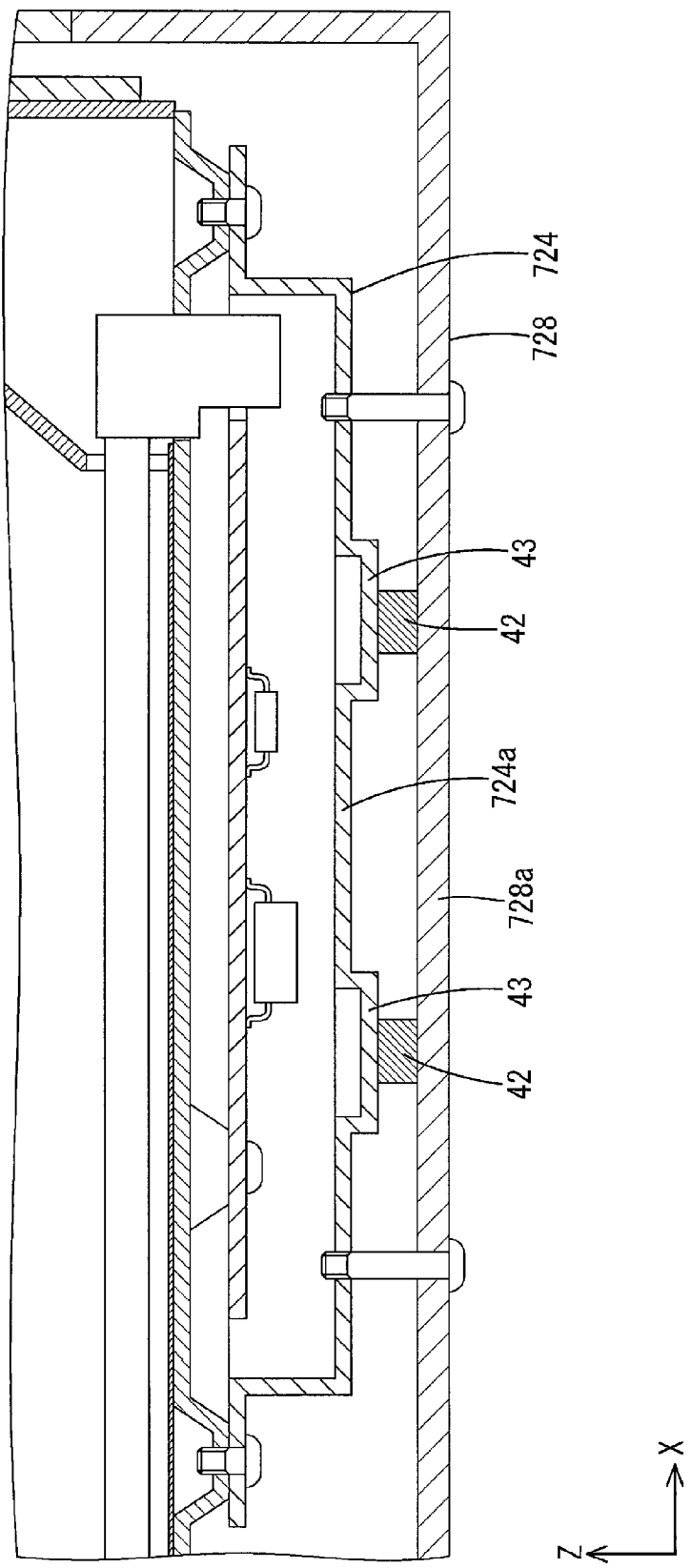
FIG. 21 is an enlarged cross sectional view of main parts including spacers according to an eighth embodiment of the present invention.

According to the present embodiment, as shown in FIG. 21, the spacers 729 are constituted by the magnets 42 that can be attached to metal and the like. The magnets 42 are fixed onto a bottom portion 728a of a second exterior member 728 by an adhesive, for example. On the other hand, a main body portion 724a of an inverter cover 724 made of metal includes flat ribs 43 extending along the surface facing the magnets 42 and bulging toward the magnets 42. As the magnets 42 are attracted by and adhered to the ribs 43, the inverter cover 724 and the second exterior member 728 can be fixed with each other without using screws, and vibration that may be caused in the inverter cover 724 or the second exterior member 728 can be damped in a preferred manner.

Other Embodiments

The present invention is not limited to the embodiments above described and illustrated with reference to the drawings, and the following embodiments may be included in the technical scope of the present invention.

(1) While the spacers are made of rubber material in the first, fifth, sixth, and seventh embodiments, elastic material other than rubber material may be used. Examples of such elastic material are sponge material, foam material (such as styrene foam or urethane foam), Noiron (registered trademark), PORON (registered trademark), acrylic foam, nylon, and vinyl. The auxiliary elastic material according to the second modification of the fourth embodiment may also be modified as described above as appropriate.

(2) While the screws are inserted through the spacers according to the first embodiment, the insertion holes of the spacers may be omitted such that the screws are not inserted through the spacers, while the bottom portion of the second exterior member and the main body portion of the inverter cover are fixed with each other by the screws. In this case, too, the spacers can be sandwiched to be hold between the bottom portion of the second exterior member and the main body portion of the inverter cover such that the predetermined anti-vibration effect can be obtained.

(3) While the spacers are made of elastic material with the anti-vibration function according to the foregoing embodiments, spacers made of vibration damping material with a vibration damping function may be used. The vibration damping material is intended to refer to material that damps vibration by converting vibration energy into thermal energy. Examples are damping alloys (such as cast iron, magnesium alloy, and ferritic stainless steel) and damping steel sheets. Damping steel sheets are a composite material made from predetermined steel sheets with rubber or plastic therebetween.

(4) Other than the foregoing embodiments, the specific arrangement or covering range of the spacers with respect to the inverter covers may be modified as appropriate. Specifically, the long side direction of the spacers and that of the inverter covers may intersect (be orthogonal to) with each other. The spacers may be disposed closer to any of the attaching portions on the main body portion of the inverter covers. The spacers may be dimensioned to substantially entirely cover the main body portion of the inverter.

(5) Other than the foregoing embodiments, the number of the spacers provided for the main body portion of the inverter covers may be modified as appropriate. For example, the present invention includes the configuration in which three or more spacers are provided for a single inverter cover.

(6) In the foregoing embodiments, the spacers have an elongated square shape in plan view. However, the shape of the spacers may be modified as appropriate, such as to a square, a circle, an ellipse, or a polygon other than a rectangle.

(7) Other than the foregoing embodiments, the number or arrangement of the attaching portions of the inverter covers may be modified as appropriate. The arrangement and relative size of the inverter boards and the inverter covers with respect to the bottom plate of the chassis may be modified as appropriate.

(8) Other than the foregoing embodiments, the arrangement, number, relative size and the like of the reinforcing members with respect to the bottom plate of the chassis may be modified as appropriate. Specifically, the reinforcing members may extend along the long side direction of the bottom plate of the chassis. Further, the length dimension of the reinforcing members may be set slightly smaller than the short side dimension of the bottom plate (such that the reinforcing members do not extend throughout the length of the bottom plate). The specific cross sectional shape of the reinforcing members may be modified as appropriate.

(9) In the foregoing embodiments, the inverter covers constitute the first fixing members fixed onto the bottom portion of the second exterior member via a gap. However, the first fixing members may be constituted by components other than the inverter covers. For example, the present invention includes the configuration in which the first fixing members are constituted by the reinforcing members fixed onto the bottom portion of the second exterior member via a gap. It is also possible to constitute the first fixing members by forming ribs protruding toward the rear side from the bottom plate of the chassis in a bulging manner. In any of these configurations, vibration can be damped by interposing the spacers between the reinforcing members or ribs as the first fixing members and the bottom portion.

(10) In the foregoing embodiments, the reinforcing members constitute the second fixing members fixed on the bottom portion of the second exterior member in an abutting manner. However, the second fixing members may be constituted by members other than the reinforcing members. For example, the present invention includes the configuration in which the second fixing members directly fixed onto the bottom portion of the second exterior member in an abutting manner are constituted by the inverter covers. The second fixing members may also be constituted by ribs protruding from the bottom plate of the chassis on the rear side in a bulging manner.

(11) While in the foregoing embodiments the cold cathode tubes are used as the linear light sources, other types of discharge tubes, such as hot cathode tubes, may be used as the linear light sources.

(12) While in the foregoing embodiments the linear cold cathode tubes are used as the light sources, point light sources such as LEDs may be used. In this case, an LED drive board may be used instead of the inverter boards for supplying drive power to the LEDs, a board cover may be used instead of the inverter cover for covering the LED drive board, and the spacers may be interposed between the board cover and the bottom portion of the second exterior member.

(13) In the foregoing embodiments, the liquid crystal panel and the chassis are vertically arranged with their short side directions aligned with the vertical direction, by way of example. The present invention also includes a configuration in which the liquid crystal panel and the chassis are vertically arranged with their long side directions aligned with the vertical direction.

(14) In the foregoing embodiments, as the switching elements of the liquid crystal display device, TFTs are used. The present invention, however, may be applied to liquid crystal display devices using switching elements other than TFTs (such as thin-film diodes (TFDs)). Further, the present invention may be applied not only to a liquid crystal display device for color display but also to a liquid crystal display device for monochrome display.

(15) While in the foregoing embodiments liquid crystal display devices using a liquid crystal panel as a display panel has been described by way of example, the present invention may be applied to display devices using other types of display panels.

(16) While in the foregoing embodiments a television device with a tuner has been described by way of example, the present invention may be applied to a display device without a tuner.

EXPLANATION OF SYMBOLS 10, 610: Liquid crystal display device (Display device)
11: Liquid crystal panel (Display unit)
11a, 11b: Glass substrate (Substrate)
12: Backlight unit (Lighting unit)
14: Chassis
18: Cold cathode tube (Light source)
18b: Outer lead (External connecting portion)
21: Inverter board (Power supply board)
22: Connector (Connecting component)
24, 224, 324, 424, 524, 724: Inverter cover (Board cover, first fixing member, fixing member)
24c, 224c: Attaching portion
26: Reinforcing member (Second fixing member, fixing member)
27: First exterior member (Exterior member)
28, 428, 528, 628, 728: Second exterior member (Exterior member)
28a, 428a, 528a, 628a, 728a: Bottom portion
29, 129, 229, 329, 429, 529, 629: Spacer
C: Gap
TR: Transformer
TV: Television device

The invention claimed is:

1. A display device comprising:
a display unit configured to display an image;
a lighting unit including a light source and a chassis housing the light source, the lighting unit being configured to supply light to the display unit;
an exterior member housing the display unit and the lighting unit, the exterior member including a bottom portion facing the chassis;
a plurality of fixing members for fixing the bottom portion of the exterior member, the fixing members
being disposed on a surface of the chassis facing the bottom portion of the exterior member, and
including a first fixing member and a second fixing member, the first fixing member being spaced from the bottom portion of the exterior member, the second fixing member being in contact with the bottom portion; and
a spacer configured to damp vibrations and arranged between the first fixing member and the bottom portion of the exterior member.

2. The display device according to claim 1, wherein the spacer is a separate component from the first fixing member and the bottom portion of the exterior member.

3. The display device according to claim 2, wherein the spacer is made of an elastic material.

4. The display device according to claim 3, wherein the spacer is made of a rubber material.

5. The display device according to claim 2, wherein the spacer has a sheet shape extending along the bottom portion of the exterior member.

6. The display device according to claim 5, wherein
the first fixing member has an elongated shape, and
the spacer has an elongated shape with a long side direction aligned with a long side direction of the first fixing member.

7. The display device according to claim 1, wherein the spacer is integrally provided with at least one of the first fixing member and the bottom portion.

8. The display device according to claim 7, wherein the spacer has a spring shape protruding from at least one of the first fixing member and the bottom portion of the exterior member toward the other one of the first fixing member and the bottom portion of the exterior member, and is in contact therewith.

9. The display device according to claim 8, wherein the spacer is fixed to the other one of the first fixing member and the bottom portion of the exterior member.

10. The display device according to claim 1, wherein
the lighting unit includes a power supply board and a board cover,
the power supply board is disposed between the chassis and the bottom portion of the exterior member, and is configured to supply drive power to the light source,
the board cover covers the power supply board and is attached to the chassis, the board cover constitutes the first fixing member, and
the spacer is disposed between the board cover and the bottom portion.

11. The display device according to claim 10, wherein
the board cover includes an attaching portion at an outer end attached to the chassis, and
the spacer is disposed in a central position of the board cover away from the attaching portion.

12. The display device according to claim 11, wherein
the attaching portion includes a plurality of attaching portions arranged away from each other at the outer end of the board cover, and
the spacer is disposed in an intermediate position on the board cover between the adjacent attaching portions.

13. The display device according to claim 10, wherein the power supply board includes a step-up transformer.

14. The display device according to claim 10, wherein
the light source includes a plurality of light sources each having a liner shape, the light sources being arranged parallel to each other in the chassis with axes thereof aligned with a same direction, and
the power supply board and the board cover extend in a direction that crosses the axed of the light sources and have dimensions that cover the plurality of the light sources.

15. The display device according to claim 10, further comprising a connector arranged at an end of the chassis, wherein
the light source has a linear shape and includes an external connecting portion at an end portion thereof,
the connector is configured to electrically connect the external connecting portion to the power supply board to relay the power, and
the power supply board and the board cover are adjacently arranged to the connector.

16. The display device according to claim 1, further comprising a reinforcing member extending along a side of the chassis, the reinforcing member constituting the second fixing member.

17. The display device according to claim 16, wherein the reinforcing member is arranged closer to the center of the chassis and the bottom portion than the first fixing member.

18. The display device according to claim 16, wherein the reinforcing member extends along the entire length of a side of the chassis.

19. The display device according to claim 1, wherein the display unit is a liquid crystal panel including a pair of substrates with liquid crystal enclosed therebetween.

20. A television device comprising the display device according to claim 1.

\* \* \* \* \*